US009862602B1

United States Patent
Riso et al.

(10) Patent No.: US 9,862,602 B1
(45) Date of Patent: Jan. 9, 2018

(54) CRACKING OF A PROCESS GAS

(71) Applicant: Lyten, Inc., Sunnyvale, CA (US)

(72) Inventors: Thomas Riso, Elizabeth, CO (US);
Philip David Fulmer, San Jose, CA (US); Ryan Balmores, Santa Clara, CA (US); Hossein-Ali Ghezelbash, Santa Clara, CA (US); Bryce H. Anzelmo, Mountain View, CA (US)

(73) Assignee: Lyten, Inc., Sunnyvale, CA (US)

( * ) Notice: Subject to any disclaimer, the term of this patent is extended or adjusted under 35 U.S.C. 154(b) by 0 days.

(21) Appl. No.: 15/470,450

(22) Filed: Mar. 27, 2017

(51) Int. Cl.
| | | |
|---|---|---|
| C23C 16/00 | (2006.01) |
| C01B 3/24 | (2006.01) |
| C10G 9/00 | (2006.01) |
| B01J 2/00 | (2006.01) |
| C01B 31/02 | (2006.01) |
| C01B 31/04 | (2006.01) |
| C04B 35/628 | (2006.01) |

(52) U.S. Cl.
CPC .......... *C01B 3/24* (2013.01); *B01J 2/006* (2013.01); *C01B 31/0226* (2013.01); *C01B 31/0293* (2013.01); *C01B 31/04* (2013.01); *C01B 31/0446* (2013.01); *C04B 35/62839* (2013.01); *C10G 9/00* (2013.01); *C01B 2202/02* (2013.01); *C01B 2202/06* (2013.01); *C01B 2203/0272* (2013.01); *C01B 2203/085* (2013.01); *C01B 2203/1235* (2013.01)

(58) Field of Classification Search
CPC ....... C01B 3/24; C01B 31/04; C01B 31/0446; C01B 31/0293; C01B 31/0226
See application file for complete search history.

(56) References Cited

U.S. PATENT DOCUMENTS

| 3,217,056 A | 11/1965 | Kurt et al. |
| 3,409,695 A | 11/1968 | Kurt et al. |

(Continued)

FOREIGN PATENT DOCUMENTS

| JP | H0290939 A | 3/1990 |
| JP | 2003206102 | 7/2003 |

(Continued)

OTHER PUBLICATIONS

Biomedical Engineering Desk Reference. Oxford: Academic Press, 2009, pp. iii-vi, 267, Print.

(Continued)

*Primary Examiner* — Kelly M Gambetta
(74) *Attorney, Agent, or Firm* — The Mueller Law Office, P.C.

(57) ABSTRACT

A process gas (such as a hydrocarbon gas) is flowed through a thermal cracking apparatus to crack the process gas into constituent components (such as hydrogen gas and solid carbon nano-particles, e.g., carbon nano-onions, necked carbon nano-onions, carbon nanospheres, graphene, graphite, highly ordered pyrolytic graphite, single walled nanotubes, and/or multi-walled nanotubes). The thermal cracking apparatus has an elongated heating element disposed within an inner volume along a longitudinal axis thereof. The elongated heating element heats the process gas as it flows within a longitudinal elongated reaction zone to thermally crack molecules of the process gas into the constituent components of the molecules.

17 Claims, 15 Drawing Sheets

(56) References Cited

U.S. PATENT DOCUMENTS

| | | | |
|---|---|---|---|
| 3,706,445 A | | 12/1972 | Gentry |
| 5,321,177 A | * | 6/1994 | Nakamura ................ C07C 4/22 203/30 |
| 5,321,191 A | * | 6/1994 | Alagy ...................... C10G 9/24 585/648 |
| 5,572,866 A | | 11/1996 | Loving |
| 5,693,173 A | * | 12/1997 | Colombo .............. C30B 23/066 118/723 HC |
| 6,692,718 B1 | * | 2/2004 | Osawa ................... B82Y 30/00 204/157.44 |
| 7,022,149 B2 | | 4/2006 | Krause et al. |
| 7,981,396 B2 | * | 7/2011 | Harutyunyan ........... B01J 8/007 423/447.3 |
| 8,034,321 B2 | | 10/2011 | Mauthner et al. |
| 8,147,765 B2 | | 4/2012 | Muradov et al. |
| 8,475,760 B2 | | 7/2013 | Rajala et al. |
| 9,051,185 B2 | | 6/2015 | Levendis et al. |
| 2003/0138365 A1 | | 7/2003 | Obidniak et al. |
| 2004/0265211 A1 | | 12/2004 | Dillon et al. |
| 2005/0003247 A1 | | 1/2005 | Pham |
| 2007/0186470 A1 | | 8/2007 | Ennis |
| 2009/0220767 A1 | | 9/2009 | Schlogl et al. |
| 2011/0033639 A1 | | 2/2011 | Coll et al. |
| 2012/0258374 A1 | | 10/2012 | Raston et al. |

FOREIGN PATENT DOCUMENTS

| | | |
|---|---|---|
| JP | 2003212502 | 7/2003 |
| JP | 2012059462 A | 3/2012 |

OTHER PUBLICATIONS

Bystrzejewski et al., Catalyst-free synthesis of onion-like carbon nano-particles, New Carbon Materials, vol. 25, No. 1, Feb. 2010, pp. 1-8.

Cadez et al., Influence of hydrocarbons on vibrational excitation of H2 molecules, Nuclear Engineering and Design (241, Apr. 2011), 1267-1271.

Konno et al, Direct Preparation of Hydrogen and Carbon Nanotubes by Microwave Plasma Decomposition of Methane over Fe/Si Activated by Biased Hydrogen Plasma, Green and Sustainable Chemistry, 2013, 3, 19-25, http://dx.doi.org/10.4236/gsc.2013.31004 Published Online Feb. 2013 (http://www.scirp.org/journal/gsc).

Definition of coat, accessed online at https://www.merriam-webster.com/dictionary/coat on Jul. 24, 2017.

Definition of coating, accessed on line at https://www.merriam-webster.com/dictionary/coating on Jul. 24, 2017.

Dresselhaus, et al., Science of Fullerenes and Carbon Nanotubes, pp. 60-79 (Academic Press 1996).

Notice of Allowance dated Jul. 28, 2017 for U.S. Appl. No. 15/594,032.

Obraztsova, et al., Raman Identification of Onion-Like Carbon, Carbon 1998; 36(5-6): 821-826.

Scientific Background on the Nobel Prize in Physics 2010, GRAPHENE compiled by the Class for Physics of the RoyalSwedish Academy of Sciences, pp. 1-1 (2010).

* cited by examiner

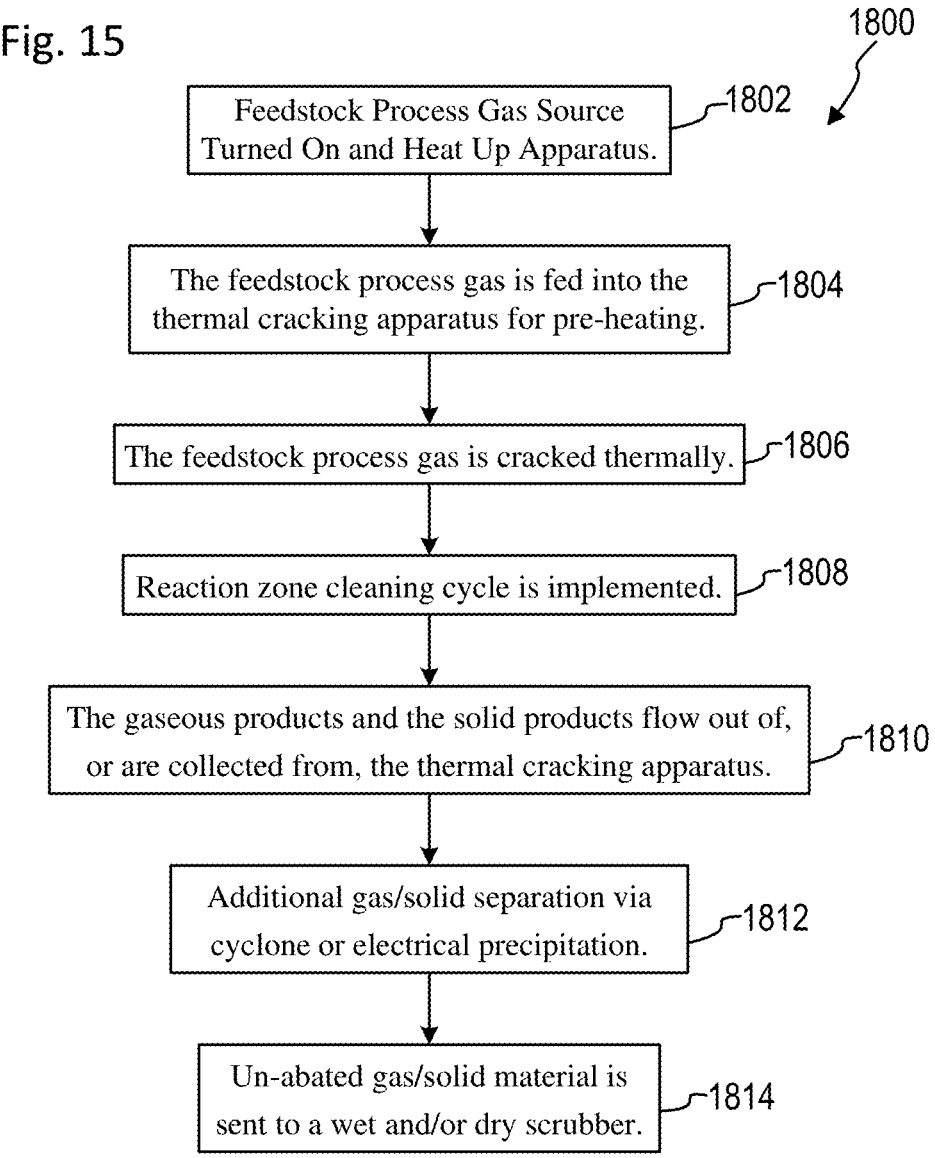

CRACKING OF A PROCESS GAS

BACKGROUND

Hydrocarbons (e.g., methane, ethane, propane, etc.) can be pyrolyzed or cracked to synthesize hydrogen and/or to produce solid carbon materials, as well as higher order carbon substances. However, many processes used to produce these higher-order carbon substances require the use of catalysts, such as metal catalysts. Additionally, many processes also result in the presence of impurities or contaminants, such as metallic and/or corrosive contaminants that foul the equipment. Furthermore, many processes require additional complex steps to ensure a desired quality or purity of the resulting products.

SUMMARY

In some embodiments, a thermal cracking apparatus for cracking a feedstock process gas includes a body, a feedstock process gas inlet, and an elongated heating element. The body has an inner volume with a longitudinal axis. The inner volume has a reaction zone concentric with the longitudinal axis. A feedstock process gas is flowed into the inner volume through the feedstock process gas inlet during thermal cracking operations. The elongated heating element is disposed within the inner volume along the longitudinal axis and is surrounded by the reaction zone. During the thermal cracking operations, the elongated heating element is heated by electrical power to a molecular cracking temperature to generate the reaction zone, the feedstock process gas is heated from the elongated heating element, and the heat thermally cracks molecules of the feedstock process gas that are within the reaction zone into constituent components of the molecules.

In some embodiments, a method for cracking a feedstock process gas includes providing a thermal cracking apparatus having an inner volume that has a longitudinal axis and an elongated heating element disposed within the inner volume along the longitudinal axis; heating the elongated heating element by electrical power to a molecular cracking temperature to generate a longitudinal elongated reaction zone within the inner volume; flowing a feedstock process gas into the inner volume and through the longitudinal elongated reaction zone, wherein the feedstock process gas is heated by heat from the elongated heating element; thermally cracking molecules of the feedstock process gas within the longitudinal elongated reaction zone into constituent components thereof (e.g., hydrogen gas and one or more solid products) as the feedstock process gas flows through the longitudinal elongated reaction zone; and collecting the constituent components.

In some embodiments, the feedstock process gas includes a hydrocarbon gas, and the constituent components include hydrogen and carbon nano-particles (e.g., in a size range of 5-500 nm). In some embodiments, the carbon nano-particles include necked carbon nano-onions or at least one of: carbon nano-onions, carbon nanospheres, graphene, graphite, highly ordered pyrolytic graphite, single walled nanotubes, and multi-walled nanotubes. In some embodiments, the feedstock process gas is preheated (e.g., to 100-500° C.) by flowing the feedstock process gas through a gas preheating region between a heating chamber and a shell of the thermal cracking apparatus before flowing the feedstock process gas into the inner volume. In some embodiments, a gas having nano-particles therein is flowed into the inner volume and through the longitudinal elongated reaction zone to mix with the feedstock process gas; and a coating of a solid product (e.g., layers of graphene) is formed around the nano-particles.

Other and further embodiments of the present disclosure are described below.

BRIEF DESCRIPTION OF THE DRAWINGS

FIG. 15 depicts a simplified process flow diagram of a method for cracking a feedstock process gas in accordance with at least some embodiments.

DETAILED DESCRIPTION

Figure 1:
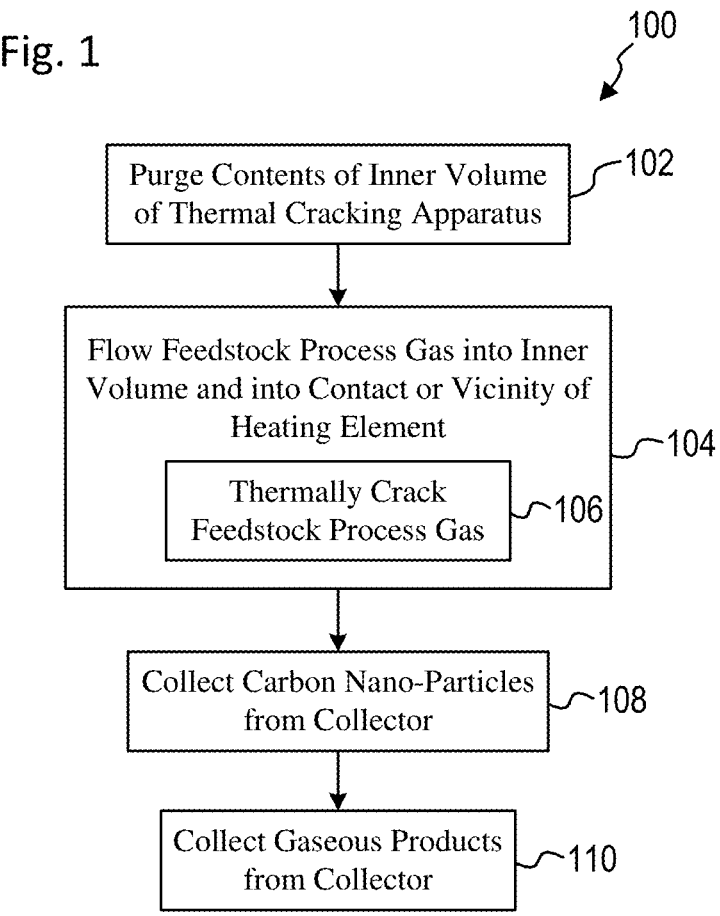
FIG. 1 depicts a simplified process flow diagram of a method for cracking a feedstock process gas in accordance with at least some embodiments.

Embodiments of the present disclosure provide thermal cracking apparatuses and methods for refining, pyrolyzing, dissociating or cracking feedstock process gases into constituent components to produce solid products (e.g., carbon nano-particles) and gaseous products (e.g., hydrogen gas and/or lower order hydrocarbon gases). The feedstock process gases generally include, for example, hydrogen gas ($H_2$), carbon dioxide ($CO_2$), C1-10 hydrocarbons, other hydrocarbon gases, natural gas, methane, ethane, propane, butane, isobutane, unsaturated hydrocarbon gases, ethene, propene, $C_2H_2$, $C_2H_4$, $C_2H_6$, $H_2S$, $SiH_4$, etc. and mixtures thereof. The carbon nano-particles generally include, for example, carbon nano-onions (CNOs), necked CNOs, carbon nanospheres, graphene, graphite, highly ordered pyrolytic graphite, single walled nanotubes, multi-walled nanotubes, and/or other solid carbon products.

Some embodiments comprise thermal cracking methods that use, for example, an elongated longitudinal heating element optionally enclosed within an elongated casing, housing or body of a thermal cracking apparatus. The body generally includes, for example, one or more tubes or other appropriate enclosures made of stainless steel, titanium, graphite, quartz, or the like. In some embodiments, the body of the thermal cracking apparatus is generally cylindrical in shape with a central elongate longitudinal axis arranged vertically and a feedstock process gas inlet at or near a top of the body. The feedstock process gas flows longitudinally down through the body or a portion thereof. In the vertical configuration, for embodiments in which the gas flow direction is downward, both gas flow and gravity assist in the removal of the solid products from the body of the thermal cracking apparatus. In some embodiments, the gas flow direction is upward in the vertical configuration.

The heating element generally includes, for example, a heating lamp, one or more resistive wires or filaments, twisted wire filaments, metal filaments, flat metallic strips, cylindrical rods, and/or other appropriate thermal radical generators or elements that can be heated to a specified temperature (i.e., a molecular cracking temperature) sufficient to thermally crack molecules of the feedstock process gas. The heating element is generally disposed, located or arranged to extend centrally within the body of the thermal cracking apparatus along the central longitudinal axis thereof. For example, if there is only one heating element, then it is placed at or concentric with the central longitudinal axis, and if there is a plurality of the heating elements, then they are spaced or offset generally symmetrically or concentrically at locations near and around and parallel to the central longitudinal axis.

Thermal cracking is generally achieved by passing the feedstock process gas over, in contact with, or within the vicinity of, the heating element within a longitudinal elongated reaction zone generated by heat from the heating element and defined by and contained inside the body to heat the feedstock process gas to or at a specified molecular cracking temperature as discussed further below. The reaction zone is considered to be the region surrounding the heating element and close enough to the heating element for the feedstock process gas to receive sufficient heat to thermally crack the molecules thereof. The reaction zone is thus generally axially aligned or concentric with the central longitudinal axis of the body. In some embodiments, the thermal cracking is performed under a specified pressure. In some embodiments, the feedstock process gas is circulated around or across the outside surface of a container of the reaction zone or a heating chamber in order to cool the container or chamber and preheat the feedstock process gas before flowing the feedstock process gas into the reaction zone.

In some embodiments, the carbon nano-particles and/or hydrogen gas are produced without the use of catalysts. In other words, the process can be catalyst-free.

Some embodiments provide a standalone system that can advantageously be rapidly scaled up or scaled down for different production levels as desired. For example, some embodiments are scalable to provide a standalone hydrogen and/or carbon nano-particle producing station system, a hydrocarbon source or a fuel cell station. Some embodiments can be scaled up to provide higher capacity systems, e.g., for a refinery or the like.

FIG. 1 depicts a simplified process flow diagram of a method 100 for cracking a feedstock process gas according to at least some embodiments. In some embodiments, the method obtains desired hydrogen and/or carbon products by thermally dissociating or cracking the feedstock process gas, e.g., gaseous hydrocarbon feedstocks. The particular steps, combination of steps, and order of steps are shown for illustrative and explanatory purposes only. Other embodiments may include other steps, combinations of steps, and/or orders of steps to achieve generally similar results.

The method 100, and variations thereof, may be carried out in any suitable thermal cracking apparatus as disclosed herein capable of control in accordance with the teachings provided herein. Illustrative, but non-limiting, examples of embodiments of a suitable apparatus are described below with respect to FIGS. 2-7 and 13.

The method 100 can produce one or more desired hydrogen and/or carbon products in accordance with some embodiments. In some embodiments, the desired products generally include gaseous products, hydrocarbon liquids, and/or solid products. The gaseous products generally include hydrogen gas and/or hydrocarbon gases. Such gaseous products can be used, for example, for a hydrogen fuel station, as a raw material source for a process requiring hydrogen gas, and/or other appropriate uses. The solid products generally include the carbon nano-particles mentioned herein. Such solid products can be used in, for example, batteries, fuel cells, digital displays, lubricants, tires, biomedical applications, various industrial products, and other applications, or combinations thereof.

The method 100 generally starts at 102, wherein an inner volume of a thermal cracking apparatus, such as the apparatus described below with respect to FIGS. 2-7, is at least partially purged of contaminants, for example, air and moisture, for example, by pulling a vacuum. Alternatively or in combination, a purge gas is flowed into the inner volume of the thermal cracking apparatus and optionally removed therefrom. The purge gas may be any suitable gas or gaseous mixture inert to the process and processing environment or that is a feedstock process gas for the process. Examples of suitable purge gases include one or more inert gases, such as noble gases, among others. In some embodiments, the purge gas is flowed into the inner volume of the thermal cracking apparatus at a flow rate of about 0.5 to about 10 slm (standard liter per minute). In some embodiments, the thermal cracking apparatus can be seasoned prior to processing the feedstock process gas by purging the inner volume of the thermal cracking apparatus with one or more purge gases, for example, at the flow rates disclosed above and with the heating element at a temperature of about 600° C. to about 3000° C., or 1600-2200° C. (e.g., at the molecular cracking temperature), for about 5 to about 80 minutes, e.g., about 35 minutes. In some embodiments, the seasoning temperature may be the same temperature as the subsequent processing temperature used to process the feedstock process gas. In some embodiments, methane, compressed/clean natural gas, or pipeline quality natural gas (or any other suitable feedstock process gas) is flowed into the inner volume of the thermal cracking apparatus for a few seconds, optionally heated, and purged from the thermal cracking apparatus.

At 104, the feedstock process gas is flowed into the inner volume of the thermal cracking apparatus and into contact with (or immediately surrounding or in the vicinity of) the heating element, i.e., a reaction zone. The feedstock process gas generally has little or no oxygen, sulfur, chlorine, or metal attached to the molecules thereof. As used herein, little or no means less than 0.5 molar percent of the total feedstock process gas. In some embodiments, the feedstock process gas comprises less than 0.5 molar % oxygen or $C_xO_y$ complexes. (Some embodiments, on the other hand, use a significant percentage of oxygen in the feedstock process gas, depending on process parameters and desired products.) The feedstock process gas is generally delivered at a known, predetermined flow rate for continuous processing embodiments. In some embodiments, before delivery to the thermal cracking apparatus or before processing, the feedstock process gas is optionally preheated (e.g., by heating delivery conduits or staging vessels). Alternatively or in combination the gaseous hydrocarbon feedstock may be heated within the thermal cracking apparatus (e.g., by providing a heat jacket or other energy source outside the thermal cracking apparatus, etc.). In some embodiments, the feedstock process gas is provided from a liquid source, and the liquid therefrom is brought to a temperature and pressure suitable to maintain the feedstock process gas in a gaseous state when introduced into the inner volume of the thermal cracking apparatus. In some embodiments, the feedstock process gas is heated to about 100 to about 500° C. before delivering the gaseous hydrocarbon feedstock to the inner volume.

In some embodiments, the feedstock process gas within the inner volume of the thermal cracking apparatus may be maintained at a relatively low pressure. Various example alternative pressure ranges generally include: about 0.5-10 atmospheres, about 1-10 atmospheres, less than about 5 atmospheres, about 1 to 3 atmospheres, and about 1 to 2 atmospheres. The low pressure advantageously allows the use of less expensive equipment compared with typical refining equipment, which operates at about 10 to about 50 atmospheres.

At 106, the feedstock process gas is thermally cracked, e.g., by heating with thermal energy provided by the heating element disposed within the inner volume of the thermal cracking apparatus. The thermal cracking apparatus thus provides sufficient thermal energy to the feedstock process gas to break or overcome at least some molecular bonds thereof to break down or fragment the reactants of the feedstock process gas into smaller components, i.e., various solid and gaseous products. To do so, for example, the heating element is heated to a temperature of about 600° C. to about 3000° C., or 1600-2200° C. Without intending to be bound by theory, it is believed that the feedstock process gas becomes radicalized and fragmented into various moieties by the thermal energy provided by the heating element. For example, in the case in which a hydrocarbon is the feedstock process gas, the hydrocarbon molecules are heated by the heating element, which cracks the hydrocarbon molecules into, for example, hydrogen ions and charged carbon atoms (and/or other hydrocarbons). The hydrogen ions can associate to form diatomic hydrogen gas. The charged carbon atoms form the carbon nano-particles. The desired products are thus produced.

In some embodiments, either or both of the carbon nano-particles or the hydrogen gas (or other desired products) can be produced without the use of catalysts, i.e., catalyst-free, using some or all of the methods and apparatus described herein. The absence of catalysts from the methods described herein avoids the use of expensive catalysts and also avoids introducing impurities or contaminants, such as metallic or other corrosive contaminants, into the carbon nano-particles or other desired products. In addition, metals, as are present in many catalysts, may be highly combustible in hydrogen gas, so the catalyst-free process avoids such situations.

In some embodiments, the carbon nano-particles may comprise a specified size and/or geometry as described more fully below. Also, partially or fully activated carbon nano-particles and gaseous products may be advantageously produced in the absence of a catalyst.

Moreover, the size of the carbon nano-particles, for example, the diameter of the particles, may be controlled. Some embodiments comprise the production of carbon nano-particles (such as carbon nano-onions) ranging in diameter from, for example, approximately 5 nanometers (nm) to approximately 300 nm in diameter or larger.

Carbon nano-particle geometry or size or the amount of hydrogen conversion may be controlled, at least in part, by controlling residence time of the feedstock process gas within the reaction zone, or within the vicinity of the heating element. Residence time in the reaction zone can be controlled, for example, by controlling the length of the reaction zone, the flow rate of the feedstock process gas, or combinations thereof. Examples of suitable residence time include between about 0.1 to about 100 seconds. In some embodiments, the feedstock process gas has a residence time greater than about two seconds. Also, in some embodiments, networks of partially and/or fully activated integrated fullerene allotropes are produced. For example, Carbon-60, i.e., "Buckyballs" further comprise layers, such as substantially concentric layers of single-walled nanotubes (SWNT) and multi-walled nanotubes (MWNT), to form carbon nano-onions. At least one example is a Carbon-60 structure surrounded by a Carbon-320 structure of graphene.

Without intending to be limited by theory, it is believed that thermal gradients are created within the thermal cracking apparatus. For example, the temperature within the inner volume of the thermal cracking apparatus is hottest at or near the heating element and relatively cooler near a wall of the thermal cracking apparatus, wherein a thermal gradient is formed therebetween. It is further believed that at higher temperatures within the thermal gradient, and/or higher residence times, hollow and/or necked carbon nano-onions are formed, having smaller diameters, e.g., approximately an average of 5 nm to approximately 90 nm. At relatively lower temperature regions of the gradient, i.e., near a wall of the thermal cracking apparatus, and at shorter residence times, larger carbon nano-particles are formed, e.g., an average of 150-500 nm. Additionally, shorter residence times generally result in lower hydrogen conversion. Between these extremes of the gradient, other sized carbon nano-particles are formed, e.g., approximately 100 nm. Thus, typical ranges for the sizes of the carbon nano-onions are 5-500 nm, 5-90 nm, 5-100 nm, 100-150 nm, 100-500 nm, and 150-500 nm, among others, depending on process parameters for preheat temperature, heating element temperature, pressure, flow rate, residence time, etc.

At 108, one or more solid products, such as the carbon nano-particles, are collected in any suitable manner. For example, the carbon nano-particles may be separated from the gas stream and collected via cyclonic separation, filtering, or other appropriate collection or separation technique. In some embodiments, the carbon nano-particles are collected via a collector, such as any of the collectors discussed further below with respect to FIGS. 2-7. The collector may be placed at a location suitable to collect the carbon nano-particles from the inner volume of the thermal cracking apparatus. In some embodiments, a charge may be applied to the collector to electrostatically attract the carbon nano-particles.

At 110, gaseous desired products, such as hydrogen gas or hydrocarbon gas, are optionally collected. Various gaseous products, for example, mixtures of hydrogen gas and other hydrocarbons, having various boiling points, can be independently collected, for example, by collecting and delivering the gaseous product to a distillation apparatus to separate desired products based upon their respective boiling points. In some embodiments, the gaseous output is collected and stored for later use. For example, in some embodiments, the output gas may be hydrogen ($H_2$) and the hydrogen may be stored, in tanks or other suitable canisters, e.g., for later use on site or at a different location. Alternatively, in some embodiments, the thermal cracking apparatus may be a point of use generator of a desired product and the gaseous output is routed to another apparatus for use therein. In some embodiments, some gaseous output may be routed to another apparatus for immediate use, while a remaining portion of the gaseous output may be collected and stored.

Upon completion of collection of the desired products (e.g., at 108 and/or 110), the method 100 generally ends. However, the method 100 may include variations and/or additional processing techniques. For example, the method 100 may include a plurality of thermal cracking apparatuses, operating at the same or different conditions (e.g., varying temperatures, flow rates, and/or pressures). For example, in such embodiments, the method 100 may further comprise at least one additional thermal cracking apparatus in fluid communication with the inner volume downstream of the thermal cracking apparatus. Also, a plurality of thermal cracking apparatuses may be in fluid communication in parallel or in series.

Furthermore, some embodiments of the method 100 comprise the use of micro gas chromatograph analysis, such that the output of hydrogen gas can be measured, as well as providing data regarding the particle size, e.g., length and/or diameter of carbon nano-particles and/or the morphology of the carbon nano-particles. For example, an in-situ feedback loop may be provided by feeding data corresponding to the micro gas chromatograph results to a controller to control process parameters such as one or more of flow rate of the feedstock process gas, power provided to the heating element, power provided to gas preheating elements, flow rates of heat transfer fluids used for heating the feedstock conduits or the housing of the thermal cracking apparatus, or other potential parameters.

The method 100 may be a continuous process capable of operating continuously and/or automatically. Alternately, the method 100 may be a batch process to process a predetermined amount of the feedstock process gas. Also, a controller may be coupled to the thermal cracking apparatus to control operation of the thermal cracking apparatus. In some embodiments, the controller may further be configured to communicate with a remote computer network. In some embodiments, the controller may further be configured to communicate with and control operation of one or more additional thermal cracking apparatuses to control operation of the plurality of thermal cracking apparatuses.

Various example and non-limiting embodiments of the method 100 are disclosed herein and all features of any embodiment may be incorporated within any other embodiment without limitation. For example, in some embodiments, the method 100 for cracking a feedstock process gas includes flowing a feedstock process gas to an inner volume of the thermal cracking apparatus and into contact with or in the vicinity of the heating element (i.e., the reaction zone) of the thermal cracking apparatus, thereby thermally cracking the feedstock, producing a carbon product and hydrogen gas, as described above, without the use of catalysts, i.e., catalyst-free.

In some embodiments, the method 100 for cracking a feedstock includes flowing a purge gas, as described above, into the inner volume of the thermal cracking apparatus to remove contaminants therefrom, flowing the feedstock process gas to the inner volume of the thermal cracking apparatus and into contact with or in the vicinity of the heating element to thermally crack the feedstock process gas, producing a carbon product and hydrogen gas, without the use of catalysts, i.e., catalyst-free, wherein the feedstock process gas contains little to no $C_XO_Y$ complexes, for example, wherein the feedstock process gas comprises approximately less than 0.50 molar % oxygen.

In some embodiments, the method 100 for cracking a feedstock process gas includes flowing a purge gas, as described above, into the inner volume of the thermal cracking apparatus to remove contaminants therefrom, flowing the feedstock process gas to the inner volume of the thermal cracking apparatus and into contact with or in the vicinity of the heating element to thermally crack the feedstock process gas, to produce carbon nano-particles (e.g., solid carbon nano-onions, hollow carbon nano-onions and/or necked carbon nano-onions) that further may comprise additional layers of single-walled nanotubes, multi-walled nanotubes, and/or combinations thereof and/or graphene and/or highly ordered pyrolytic graphite, or the like, wherein varying process conditions, such as feedstock process gas flow rate, thermal cracking apparatus geometry, preheat temperatures, heating element operating temperatures and pressures, and/or feedstock process gas concentration, permits controlled modulation of the diameter of the carbon nano-particles, without the use of catalysts, i.e., catalyst-free. Also, the methods comprise the manufacture of hydrogen gas as a product gas.

In some embodiments, the method 100 utilizes a first thermal cracking apparatus, as described above, and a second thermal cracking apparatus, wherein the first thermal cracking apparatus and the second thermal cracking apparatus are fluidly coupled. In some embodiments, the method 100 utilizes a first thermal cracking apparatus, a second thermal cracking apparatus, and at least one additional thermal cracking apparatus situated between the first and second thermal cracking apparatuses, wherein the first thermal cracking apparatus, the second thermal cracking apparatus and the at least one additional thermal cracking apparatus are fluidly coupled. In some embodiments, the thermal cracking apparatuses may be fluidly coupled in series, in parallel, or combinations thereof. Embodiments further comprising more than one thermal cracking apparatus are capable of mitigating and/or eliminating undesirable by-products as well as controlling the output of products, e.g., hydrogen gas and carbon nano-particles.

Figure 2:
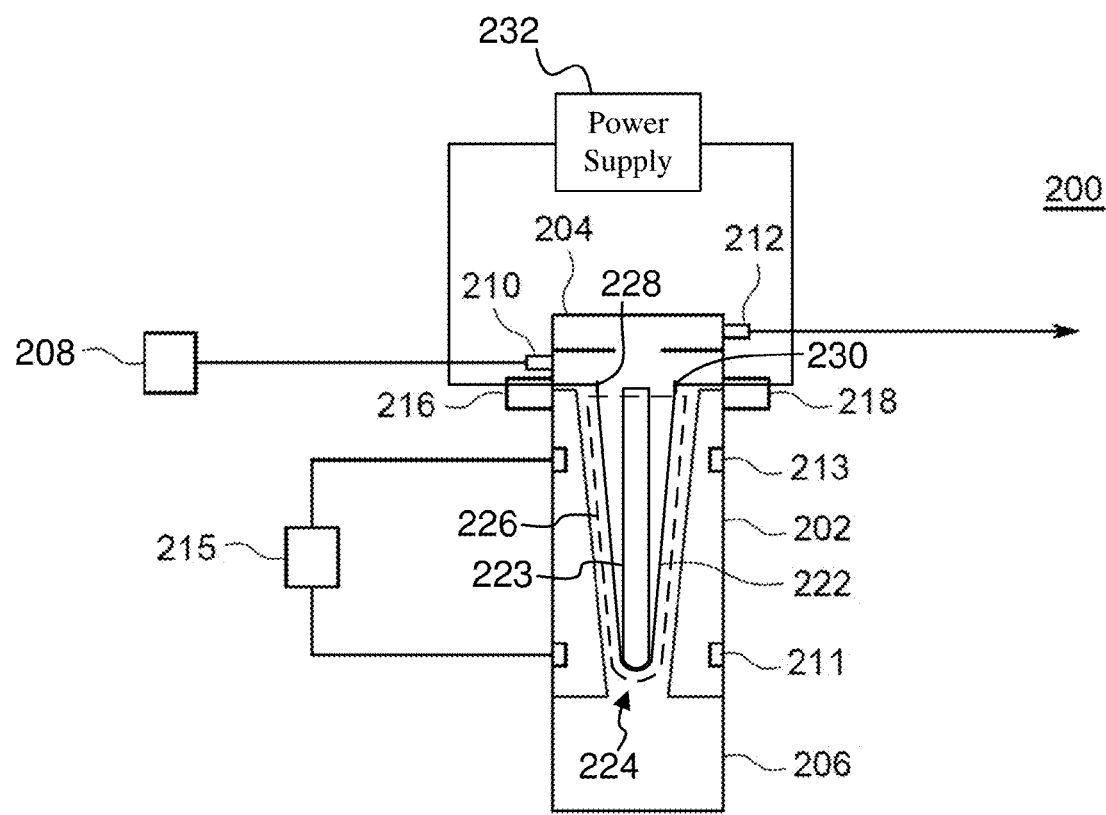
FIG. 2 depicts a simplified schematic view of a cracking apparatus in accordance with at least some embodiments.

FIG. 2 depicts a simplified schematic view of a thermal cracking apparatus 200 in accordance with at least some embodiments and suitable for performing the method 100 described above. The thermal cracking apparatus 200 generally includes a body 202, a lid 204, a collector 206, a process gas supply 208, a gas inlet 210, a gas outlet 212, a lower channel 211, an upper channel 213, a heat transfer source 215, a first electrical terminal 216, a second electrical terminal 218, a heating element 222, and a support rod 223, among other possible components not shown for simplicity.

The body 202 generally defines an inner volume 224, within a portion of which the heating element 222 is disposed. The body 202 is thus the heating chamber or reaction tube of the thermal cracking apparatus 200. In some embodiments, the heating element 222 may be axially symmetrically disposed within the inner volume 224 near or concentrically arranged around a central longitudinal axis of the body 202 of the thermal cracking apparatus 200. The portion of the inner volume 224 through which the heating element 222 extends is considered to contain a reaction zone 226 that is generated by the heating element 222 during thermal cracking operations. The reaction zone 226 may include the entire inner volume 224 or only that portion of the inner volume 224 that is within a certain distance of the heating element 222, e.g., as indicated by the dashed line.

Although the reaction zone 226 (or the inner volume 224) is depicted in FIG. 2 as being conical in shape, the reaction zone 226 may have other geometries as well. For example, conical, cylindrical, or Venturi-shaped reaction zones may be used, among other geometries. Any of these configurations can have multiple inlet or outlet ports disposed at different locations along the length of the reaction zone to control the length of travel of the feedstock process gas through the reaction zone.

In some embodiments, the heating element 222 is one or more resistive or conductive wires or filaments, metal filaments, flat conductive strips, and/or other appropriate thermal radical generators or elements that can be heated to a specified temperature. The heating element 222 may be fabricated from suitable process-compatible conductive materials such as tungsten, tantalum, or the like. The number, diameter, spacing, geometry, arrangements, material composition, etc., of the heating element 222 may be changed as desired to control the temperature, zones, reaction kinetics, resulting products, etc.

In some embodiments, the heating element 222 represents a single wire or a twisted wire filament. The twisted wire filament is also known as a bundled wire, which is formed of a bundle of multiple individual wire filaments twisted together. Any appropriate number of individual wire filaments can be used in the twisted wire filament, e.g., 4 individual wire filaments or 2-8 individual wire filaments. In some embodiments, the individual wire filaments of the twisted wire filament generally have any appropriate diameter, e.g., a diameter of 0.5 mm or 0.5-12 mm.

In some embodiments, the heating element 222 is a flat strip, instead of a round wire. For example, a flat strip having a rectangular cross section with a width of 1-15 mm and a thickness of 1-4 mm have been shown to provide a sufficient surface area to enable appropriate heat transfer to the feedstock process gas to crack the reactants into the desired products.

The heating element 222 is made of any appropriate electrically resistive material capable of the desired temperature level with an appropriate level of applied electrical power. Relevant factors for selecting an appropriate material generally include a lower thermal expansion coefficient, a higher resistivity, and a higher melting point temperature. In some embodiments, for example, the heating filament 222 is made of tungsten (W), tantalum (Ta), molybdenum (Mo), iridium (Ir), rhenium (Re), ruthenium (Ru), nichrome alloys, or graphite. Tungsten and tantalum have relatively high melting points, which generally render them more suitable as heating element materials herein. Tantalum carbides have an even higher melting point than tantalum alone has; whereas, tungsten carbides have a lower melting point than tungsten alone has. Tantalum has a higher resistivity, but also a higher thermal expansion coefficient, than does tungsten. Under some thermal cracking conditions, tungsten is more likely to crack or form graphitic spheres or nodules on its surface. The preferred heating element material thus generally depends on the particular operating parameters and thermal cracking device configuration for a desired thermal cracking operation.

An advantage of the twisted wire filament over a single wire filament is that the twisted wire filament has a larger surface area for radiating heat to the surrounding feedstock process gas during thermal cracking operations. Overall thermal cracking efficiency or conversion when using the twisted wire filament is thus improved or increased, thereby resulting in greater production of desired gaseous and solid products. In some embodiments, a twisted wire filament demonstrated greater than a 50% improvement over a single wire filament for thermal cracking of methane. Another advantage of the twisted wire filament over a single wire filament is that the twisted wire filament is less prone to breakage, particularly after repeated thermal cycling for multiple thermal cracking operations.

In the illustrated embodiment, the heating element 222 is a wire, twisted wire filament or flat strip whose ends are coupled to electrodes 228 and 230. The heating element 522 is stretched from the first electrode 228, down under the support rod 223, and back up to the second electrode 230. The support rod 223 is coupled to the lid 204 for mechanical stability and extends longitudinally down into the reaction zone 226 (or the inner volume 224).

In some embodiments, the heating element 222 is coupled to a power supply to cause the generation of heat by conduction of electrical energy from the power supply through the heating element 222. Electrical power may be provided to the heating element 222 from a power supply 232 via the first and second electrical terminals 216, 218. The electrical terminals 216, 218 are electrically coupled to the electrodes 228 and 230 (and thus to the ends of the heating element 222) and to the power supply 232. The heating element 222 is configured to be heated by the electrical power to a suitable temperature to dissociate the feedstock process gas passing through the reaction zone 226 of the thermal cracking apparatus 200. For example, in some embodiments, the heating element 222 may be heated to a temperature of about 600° C. to about 3000° C., or 1600-2200° C. The electrical power level or the temperature may be selected dependent upon at least one of the type of the feedstock process gas to be dissociated or the type of the desired products to be produced.

In some embodiments, the electrical power provided to the heating element 222 by the power supply 232 is adjusted by a feedback loop during thermal cracking operations in order to maintain the desired power level. For some types of heating element materials, the conductivity (or resistivity) of the heating element 222 changes due to carbon buildup on, or carbonization of, the heating element material. Tantalum, for example, reacts with the carbon to form carbon tantalum, which has a different resistivity than tantalum. The feedback loop thus detects changes in the resistance of the heating element 222 and adjusts the voltage and/or amperage output level of the power supply 232 to maintain a relatively constant power level, thereby maintaining a relatively constant operating temperature for the reaction zone.

The inlet 210 and the outlet 212 are fluidly coupled to the body 202 or the lid 204 to access the inner volume 224 proximate a larger diameter end of the inner volume 224 (e.g., proximate the top of the upwardly expanding cone, assuming a conical shape). The process gas supply 208 is coupled to the inlet 210 to provide the feedstock process gas to the inner volume 224. In some embodiments, the collector 206 is coupled to the bottom of the body 202 of the thermal cracking apparatus 200 proximate the smaller diameter end of the inner volume 224 (e.g., proximate the bottom of the upwardly expanding cone, assuming a conical shape).

In use during processing, the feedstock process gas is delivered into the inner volume 224 via the inlet 210. The feedstock process gas is then heated by the thermal energy provided by the heating element 222 sufficiently to at least partially dissociate the molecules thereof. Resultant gaseous products from the thermal dissociation exit the thermal cracking apparatus 200 through the outlet 212. In embodiments where solid products of the dissociation are created, such as carbon nano-particles, the carbon nano-particles flow, fall, or are pushed down toward the bottom of the inner volume 224 and move into the collector 206, where they are retained.

In some embodiments, the thermal cracking apparatus 200 includes a heat transfer apparatus to facilitate cooling the outer components of the thermal cracking apparatus 200, such as the body 202. For example, in some embodiments, channels are disposed within the body 202 to flow a heat transfer medium, such as a coolant, supplied by the heat transfer source 215. As illustrated for example in FIG. 2, the lower channel 211 and the upper channel 213 are provided as shown for this purpose. However, other numbers of channels or configurations of channels may be used as well. Alternatively or in combination, an external cooling jacket may be coupled to the body 202 to facilitate removal of excess heat from the body 202. Alternatively or in combination, the thermal cracking apparatus 200 includes thermal insulation around the body 202 to maintain the outer surfaces thereof at or below a desired temperature, for example, to facilitate safe handling of the thermal cracking apparatus 200 or to minimize undesired reactions, explosion, or other hazards that may be triggered or accelerated due to thermal energy.

In some embodiments, the lid 204 is coupled to the top of the body 202 of the thermal cracking apparatus 200. For example, the lid 204 may be removably coupled to the body 202 to provide internal access for cleaning, maintenance, or the like. Various components, such as the inlet 210 and the outlet 212 may be disposed in the lid 204, as discussed in greater detail below.

Figure 3:
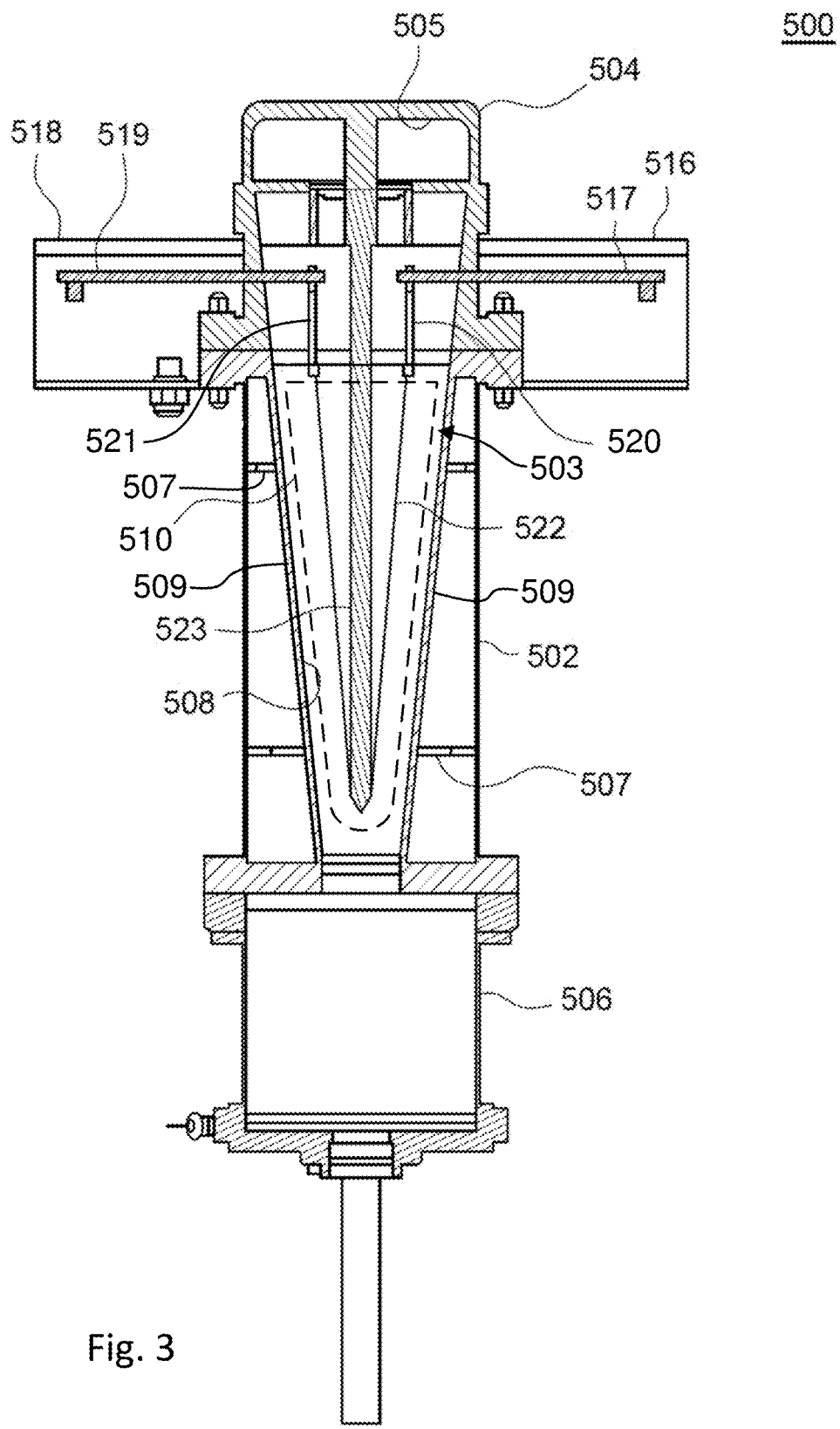
FIG. 3 depicts a simplified cross-sectional view of a cracking apparatus in accordance with at least some embodiments.

FIG. 3 depicts a simplified cross-sectional view of a thermal cracking apparatus 500 in accordance with some embodiments. The thermal cracking apparatus 500 is substantially similar to the thermal cracking apparatus 200 described above except as indicated to the contrary below. The thermal cracking apparatus 500 generally includes a body 502 having an inner volume 503, a lid 504 coupled to the top of the body 502, and a collector 506 coupled to the bottom of the body 502. The inner volume 503 is generally defined by an inner surface 508 of walls 509. In some embodiments, the walls 509 are reinforced with stiffening elements 507. In some embodiments, the walls 509 and stiffening elements 507 are part of an insert disposed within (i.e., inserted within) an outer shell of the body 502. In use during processing, a longitudinal reaction zone 510 is formed within the inner volume 503 and includes all or part of the inner volume 503, e.g., similar to the reaction zones mentioned above. The reaction zone 510 is generated by a heating element 522 during thermal cracking operations. The body 502 is thus the heating chamber or reaction tube of the thermal cracking apparatus 500.

In some embodiments, the thermal cracking apparatus 500 further includes a first housing 516 encapsulating a first electrode 517 and a second housing 518 encapsulating a second electrode 519. The first and second housings 516, 518 are coupled to the lid 504 as shown (or an upper portion of the body 502). The first and second electrodes 517, 519 are coupled to an external power source (not shown) and extend into an upper portion of the inner volume 503 and are coupled to corresponding wire lugs (first and second wire lugs 520 and 521, respectively) of the heating element 522. The heating element 522 extends into the reaction zone 503 generally along, and spaced or offset generally symmetrically or concentrically at locations near and around, a central longitudinal axis of the thermal cracking apparatus 500 or the body 502 thereof. The thermal cracking apparatus 500 functions similarly to the thermal cracking apparatus 200, as described above.

In some embodiments, the heating element 522 represents a single wire, a twisted wire filament or a flat strip whose ends are coupled to the wire lugs 520 and 521. The heating element 522 is stretched from the first wire lug 520, down under a quartz rod 523, and back up to the second wire lug 521. The quartz rod 523 is coupled to a ceiling 505 of the lid 504 for mechanical stability. In some embodiments, the heating element 522 is similar to the heating element 222, as described above.

Figure 4:
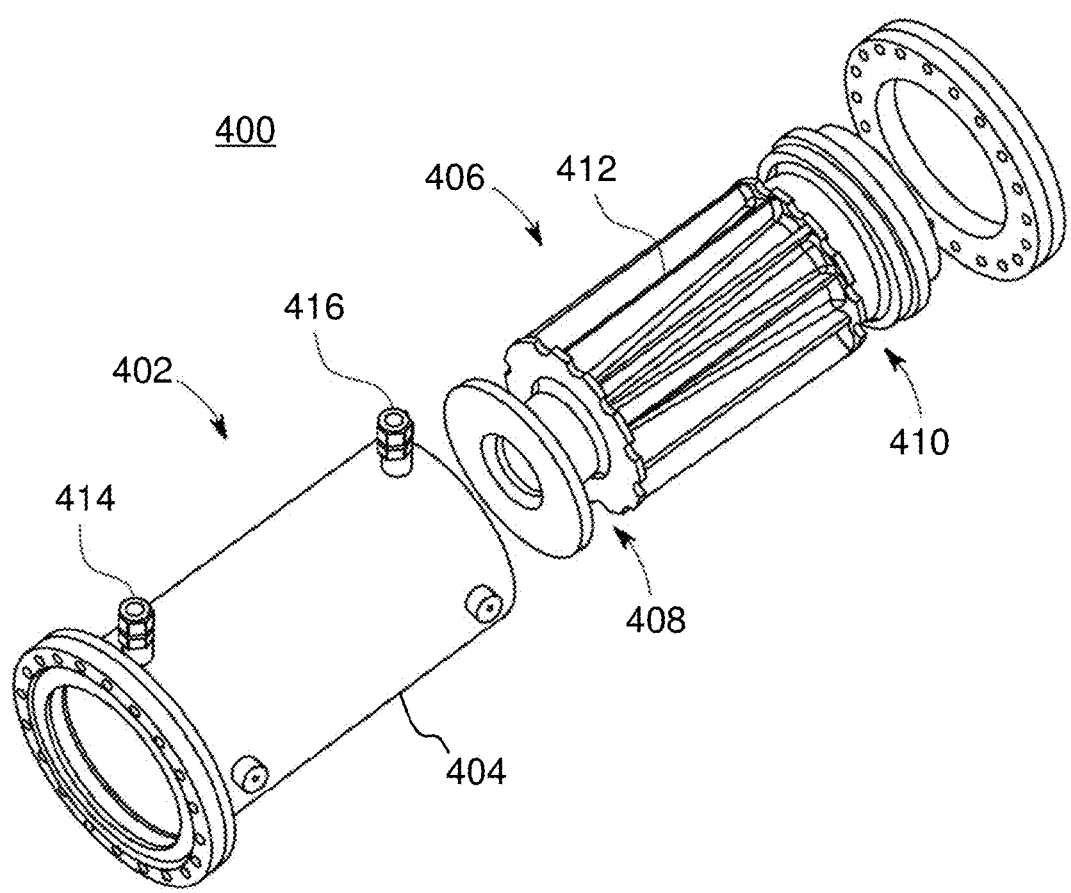
FIG. 4 depicts a simplified isometric exploded view of a cracking apparatus in accordance with at least some embodiments.

FIG. 4 illustrates some variations on the embodiments shown in FIGS. 2 and 3 with an exploded view of a portion of a thermal cracking apparatus 400 (e.g., similar in some respects to a portion of the thermal cracking apparatus 200 and 500). The thermal cracking apparatus 400 generally includes a body 402 with an outer shell 404 and an insert 406. In some embodiments, cooling channels are provided to circulate a heat transfer medium (e.g., a coolant) from a coolant source through the cooling channels. The cooling channels are disposed within the body 402, for example, between the outer shell 404 and the insert 406. In some embodiments, the insert 406 has an outer surface with an outer profile that defines, together with the inner surface of the outer shell 404, one or more channels for the heat transfer medium to flow. In some embodiments, a lower annular channel 408 and an upper annular channel 410 are provided. In some embodiments, the lower annular channel 408 and the upper annular channel 410 are fluidly coupled within the body 402. For example, one or more openings may be provided in each of the lower annular channel 408 and the upper annular channel 410 to couple each of the lower annular channel 408 and the upper annular channel 410 to each other via an intermediate volume disposed within the body 402 between the lower annular channel 408 and the upper annular channel 410 and between the insert 406 and the outer shell 404. In some embodiments, the insert 406 has a plurality of external fins 412, which may be disposed within the intermediate volume between the lower and upper annular channels 408, 410 to facilitate heat transfer from the insert 406 to the heat transfer medium flowing between the lower annular channel 408 and the upper annular channel 410 and through the intermediate volume. In some embodiments, the fins 412 are an integral part of the insert 406.

The heat transfer medium can be flowed from the lower annular channel 408 to the upper annular channel 410 or from the upper annular channel 410 to the lower annular channel 408 to facilitate heat transfer from the insert 406 to the heat transfer medium. When present, the fins 412 further facilitate heat transfer from the insert 406 to the heat transfer medium. A heat transfer supply line (not shown) may be coupled to a heat transfer inlet 414 and a heat transfer return line (not shown) may be coupled to a heat transfer outlet 416 of the body 402 (or the outer shell 404) to facilitate flow of the heat transfer medium to/from the thermal cracking apparatus 400.

Figure 5:
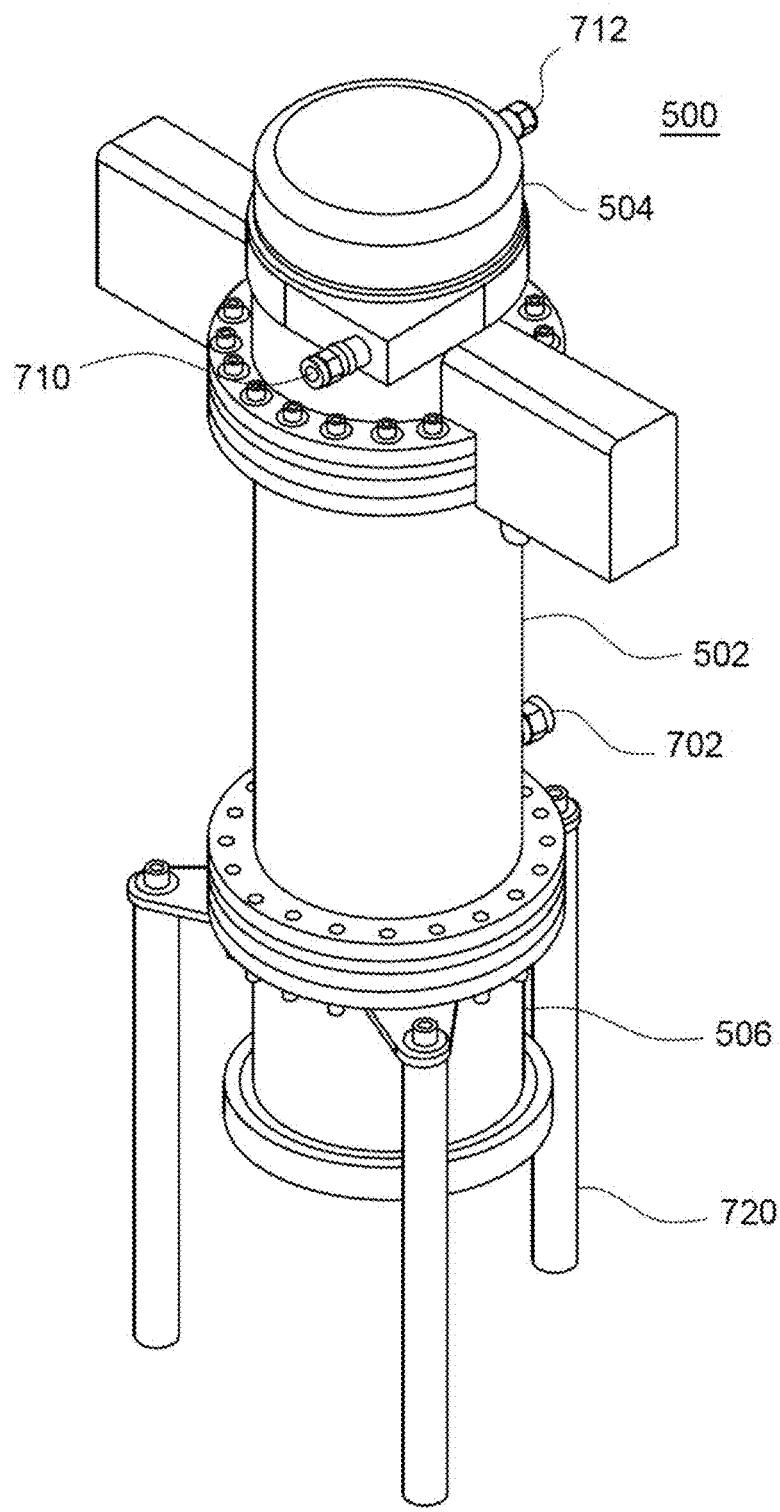
FIG. 5 depicts a simplified isometric view of the cracking apparatus shown in FIG. 3, in accordance with at least some embodiments.

FIG. 5 depicts a simplified isometric view of the thermal cracking apparatus 500 (or 200). As illustrated in FIG. 5, the thermal cracking apparatus 500 may be supported on a plurality of legs 720. Although not shown in FIG. 3, the thermal cracking apparatus 500 includes a heat transfer inlet 702, a gas inlet 710, and a gas outlet 712, which function similarly to the heat transfer inlet 414, the gas inlet 210, and the gas outlet 212, respectively, of the thermal cracking apparatus 500 or 200, as described above. Additionally, the thermal cracking apparatus 500 generally includes a heat transfer outlet (not shown), e.g., similar to the heat transfer outlet 416 described above.

Figure 6:
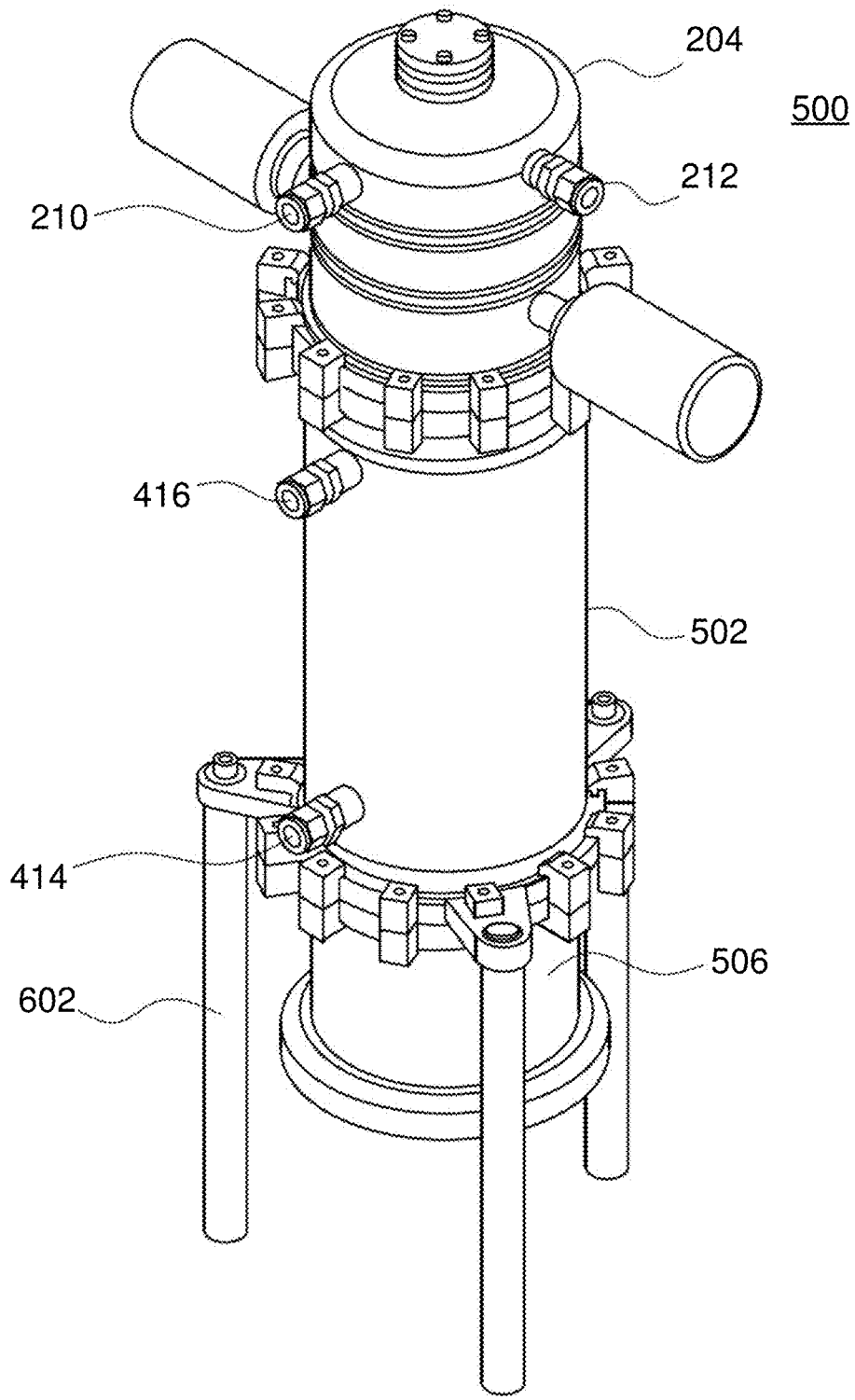
FIG. 6 depicts a simplified isometric view of the cracking apparatus of FIG. 3, in accordance with at least some embodiments.

FIG. 6 depicts an alternative simplified isometric view of the thermal cracking apparatus 500 (or 200). As illustrated in FIG. 6, the thermal cracking apparatus 500 (or 200) may be supported on a plurality of legs 602.

Figure 7:
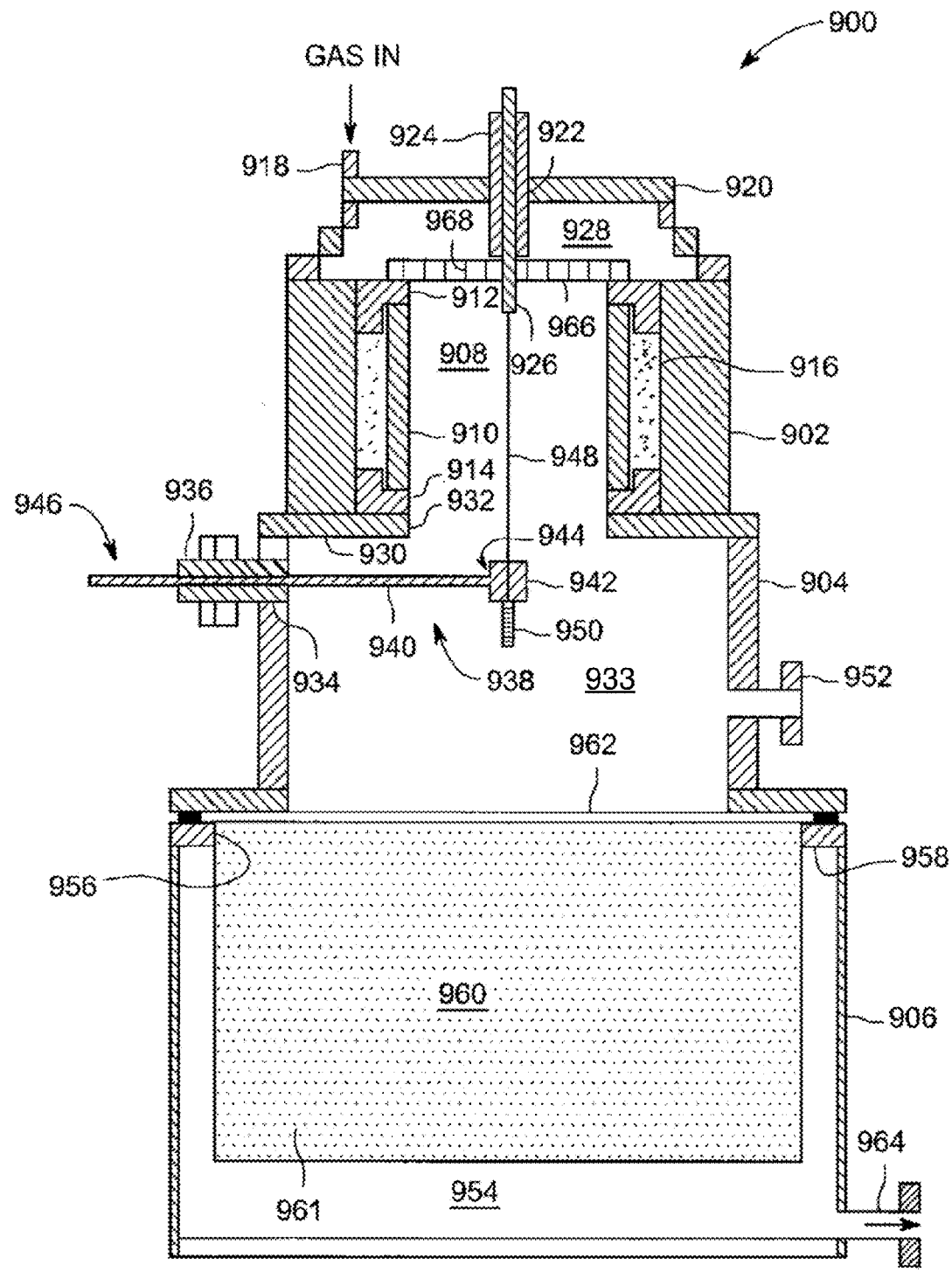
FIG. 7 depicts a simplified schematic view of a cracking apparatus in accordance with at least some embodiments.

FIG. 7 depicts a simplified schematic view of a thermal cracking apparatus 900 in accordance with at least some embodiments and suitable for performing the method 100 described above. The thermal cracking apparatus 900 generally includes an upper housing 902, a lower housing 904, and a collector 906. The upper and lower housings 902 and 904 are collectively referred to as "the body" in this embodiment. The body 902/904 and the collector 906 are formed of stainless steel, e.g., SST 316 or SST 304, or other appropriate material. In some embodiments, the upper and lower housings 902 and 904 are formed as one integral piece of material. In some embodiments, the upper and lower housings 902 and 904 are removably coupled to one another to facilitate ease of access to an interior of each housing 902 and 904.

The upper housing 902 generally includes an interior into which an insert 910 is disposed, so that the upper housing 902 and the insert 910 are considered a dual wall structure. The insert 910 includes inner walls that define an inner volume 908, all or part of which includes a longitudinal reaction zone generated by a heating element 948 during thermal cracking operations. The upper housing 902 or the insert 910 is thus considered the heating chamber or reaction tube of the thermal cracking apparatus 900.

Although the insert 910 is shown with the inner volume 908 being cylindrical, the insert 910 may alternatively have a downwardly and inwardly tapering conically shaped inner surface similar to that described above for the inner volume 224 of the body 202. The insert 910 is formed of a thermally reflective material such as, for example, stainless steel, titanium, graphite, quartz, or the like.

Upper and lower ring supports 912 and 914 support the insert 910 and facilitate coupling, or fixing, of the insert 910 to the interior of the upper housing 902. In some embodiments, the upper and lower ring supports 912 and 914 are formed of a thermally insulative material, such as a ceramic. Alternatively, or in combination, the upper and lower ring supports 912 and 914 are configured to limit a physical surface contact between the upper and lower ring supports 912 and 914 and the insert 910 in order to reduce thermal transfer via conduction of heat from the insert 910 to the ring supports 912 and 914, the upper housing 902, and/or other surrounding components.

In some embodiments, outer surfaces of the upper and lower ring supports 912 and 914 include threads that mate with corresponding threads on an interior wall of the upper housing 902. In some embodiments, a fastening element (e.g., a screw) is alternatively used to couple the upper and lower ring supports 912 and 914 to the interior of the upper housing 902.

In some embodiments, a thermal insulator 916 is disposed between the insert 910 and the interior wall of the upper housing 902. The thermal insulator 916 is formed of a thermally insulative material, e.g., ceramic.

In some embodiments, the thermal cracking apparatus 900 further generally includes a lid 920. In some embodiments, the lid 920 is permanently or removably coupled to, or integrally formed with, an upper portion of the upper housing 902. The lid 920 includes an inlet 918 to which a gas source is coupled to provide the feedstock process gas into an inner volume 928 of the lid 920 to provide a generally laminar flow of the feedstock process gas in the thermal cracking apparatus 900. Although the inlet 918 is shown at the top of the lid 920, in some embodiments, the inlet 918 may alternatively be disposed in a side of the lid 920 to provide a rotational gas flow.

In some embodiments, the feedstock process gas is provided in a generally downwardly directional flow into the insert 910. To improve this flow, the thermal cracking apparatus 900 optionally includes a shower plate 966 having a plurality of through holes 968 (depicted as lines) to allow the feedstock process gas to pass therethrough.

In some embodiments, the lid 920 further includes a through hole 922 through which a first bulkhead fitting 924 is disposed. An electrical feedthrough 926 (e.g., a first electrode) extends through the first bulkhead fitting 924 and into the inner volume 928 of the lid 920.

The lower housing 904 is disposed beneath the upper housing 902 and may either be removably coupled to the upper housing 902 or formed integrally with the upper housing 902. The lower housing 904 generally includes a ceiling 930 having an opening 932 that is open to the inner volume 908 and the reaction zone of the upper housing 902, thereby fluidly connecting the inner volume 908 of the upper housing 902 to an inner volume 933 of the lower housing 904.

The lower housing 904 further includes a hole 934 through which a second bulkhead fitting 936 extends. An arm 938 (e.g., a second electrode) extends through the second bulkhead fitting 936 into the inner volume 933 of the lower housing 904. The arm 938 is formed of an electrically conductive material. In some embodiments, the second bulkhead fitting 936 is formed of an electrically insulative material to electrically insulate the lower housing 904 from the arm 938. In some embodiments, an insulative material may alternatively be disposed in the hole 934 between the bulkhead fitting 936, which may or may not be metallic or electrically conducting, and the lower housing 904 to electrically insulate the lower housing 904 from the arm 938. The arm 938 generally includes a shaft 940 having a base 942 at a first end 944. The ceiling 930 generally shields at least a portion of the arm 938 from the accumulation of byproducts of the thermal cracking process.

One or more heating elements 948 (one shown) of any appropriate type described above are coupled at one end (the top) to the electrical feedthrough 926 and at an opposite end (the bottom) to the base 942 at or concentric with a central longitudinal axis of the body 902/904. To flow electricity through the heating element 948, a power supply (not shown) is coupled to the electrical feedthrough 926 and a second end 946 of the arm 938 is coupled to ground (or vice versa). In some embodiments, the current flowed through the heating element 948 is controlled to control the temperature of the heating element 948. In addition, the length of the heating element 948 is selected to provide a length of the reaction zone in the inner volume 908 that, in combination with the flow rate of the feedstock process gas, controls or determines the residence time of the feedstock process gas in the reaction zone. Thus, to achieve dissociation of a particular feedstock process gas and produce the desired products, the length of the heating element 948, the power provided to the heating element 948, and the flow rate of the feedstock process gas are controlled, in some embodiments, to provide a predetermined residence time of the feedstock process gas at a predetermined temperature within the reaction zone.

The first bulkhead fitting 924 and the base 942 keep the heating element 948 taut. However, during operation, the heating element 948 may experience thermal expansion/contraction. Therefore, in some embodiments, a biasing element 950, such as a spring, is coupled to an end of the heating element 948 that extends through the base 942 to compensate for any thermal expansion/contraction of the heating element 948 and maintain tension on the heating element 948.

In some embodiments, the lower housing 904 may further include a sampling port 952 to facilitate access to the inner volume 933 of the lower housing 904 for sampling of byproducts of the process. For example, a gas chromatograph or mass spectrometer may be coupled to the sampling port 952 to sample the byproducts and provide information for controlling the amount or rate of the feedstock process gas supplied and/or the temperature of the heating element 948.

The collector 906 includes an inner volume 954, in which a mesh filter 960 is disposed. To facilitate placement of the filter 960 within the inner volume 954, the collector 906 includes a ceiling 958 having an opening 956 through which the filter 960 extends. The filter 960 may include a collar 962 having a diameter greater than the opening 956 so that the collar 962 rests on the ceiling 958. The filter 960 includes a plurality of holes 961 through which the cracked gaseous product flows. Each of the plurality of holes 961 may have a diameter sized to allow the gaseous product to flow therethrough and to prevent the solid product of the thermal cracking process from passing therethrough. In some embodiments, for example, each hole 961 has a diameter that is less than 1 micron. The collector 906 further includes a gas outlet 964 disposed beneath the filter 960 to flow out the gaseous product of the thermal cracking process.

In operation, the feedstock process gas enters the thermal cracking apparatus 900 through the inlet 918 and flows through the insert 910. As the feedstock process gas flows past the heating element 948, the feedstock process gas is dissociated into constituent elements or molecules thereof. The solid products of the dissociation are collected in or on the filter 960, while the gaseous product flows through the plurality of holes 961 and through the gas outlet 964.

Although the gas outlet 964 is illustrated at the bottom of the thermal cracking apparatus 900, the gas outlet 964 may alternatively be disposed in the lid 920 in a plane above a plane of the inlet 918. In such an embodiment, the inner volume 928 of the lid 920 generally includes a partition (not shown) to separate the incoming feedstock process gas from the outgoing gaseous product of the dissociation/cracking process. Also, in such an embodiment, the filter 960 may be excluded and the collector 906 electrically biased to attract the solid products of the dissociation process.

FIGS. 8-12 depict example micrograph images of carbon nano-particles (e.g., carbon nano-onions) having differing sizes. Each of the different types of carbon nano-particles can be produced by the thermal cracking apparatuses described herein by tuning various operating parameters thereof, e.g., temperature of the heating element, temperature of the preheated feedstock process gas, pressure within the inner volume, feedstock process gas flow rate, etc. In some embodiments, groupings of integrated carbon nano-particles are fused to create solid carbon nano-particles, hollow carbon nano-particles, and/or necked carbon nano-particles that comprise one or more of spherical or oblong shapes. Moreover, the carbon nano-particles may form highly ordered pyrolytic graphite, partially or fully activated fullerenes that are single-walled nanotubes, multi-walled nanotubes, and/or combinations thereof, such as solid carbon nano-onions, hollow carbon nano-onions and/or necked carbon nano-onions that further comprise additional layers of single-walled nanotubes, multi-walled nanotubes, and/or combinations thereof, and/or graphene, optionally producing novel carbon allotropes. In some embodiments, multi-wall fullerene nanospheres may be integrated with at least one single-walled nanotube, multi-walled nanotube, or both to form integrated fullerene allotropes. In some embodiments, groupings of integrated fullerene allotropes may be randomly fused, creating networks of activated carbon multi-wall fullerene nanospheres.

Figure 8:
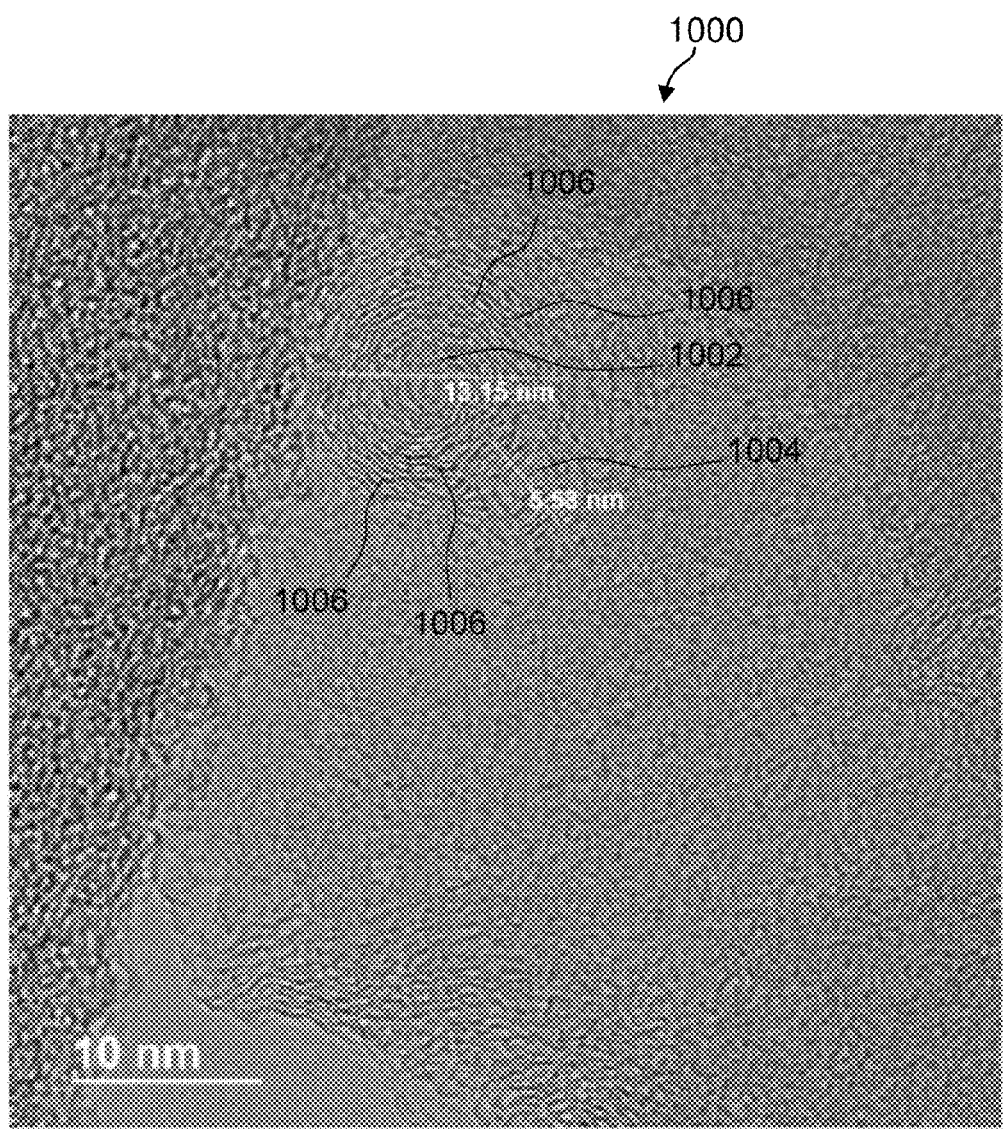
FIGS. 8-12 depict example micrograph images of carbon nano-particles, in accordance with at least some embodiments.

FIG. 8 depicts a micrograph image 1000 of carbon nano-onions formed by the thermal cracking apparatus and methods described herein, according to some embodiments. FIG. 8 was taken by transmission electron microscopy (TEM) techniques. The image 1000 shows a first small carbon nano-onion 1002 having a diameter of approximately 13 nm and a second small carbon nano-onion 1004 having a diameter of approximately 5.6 nm, which are comprised of a plurality of graphene molecules 1006 disposed in a concentric manner.

Figure 9:
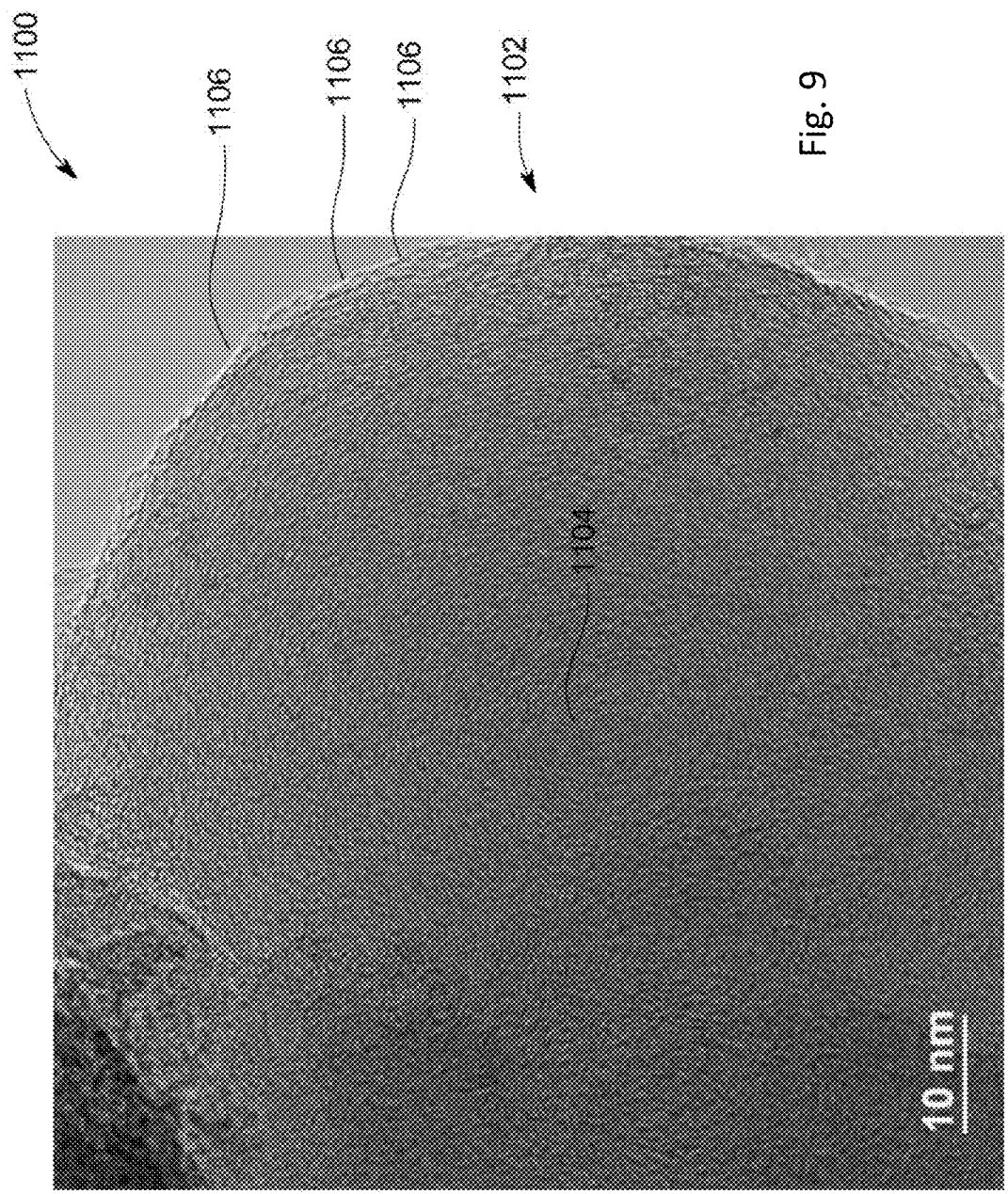

FIG. 9 depicts a micrograph image 1100 of a medium-sized carbon nano-onion 1102 formed by the thermal cracking apparatus and methods described herein, according to some embodiments. The carbon nano-onion 1102 has a diameter of approximately 95 nm and a center 1104. FIG. 9 was taken by TEM techniques. The image 1100 also shows that the medium-sized carbon nano-onion 1102 comprises a plurality of graphene molecules 1106 disposed in a concentric manner around the center 1104.

Figure 10:
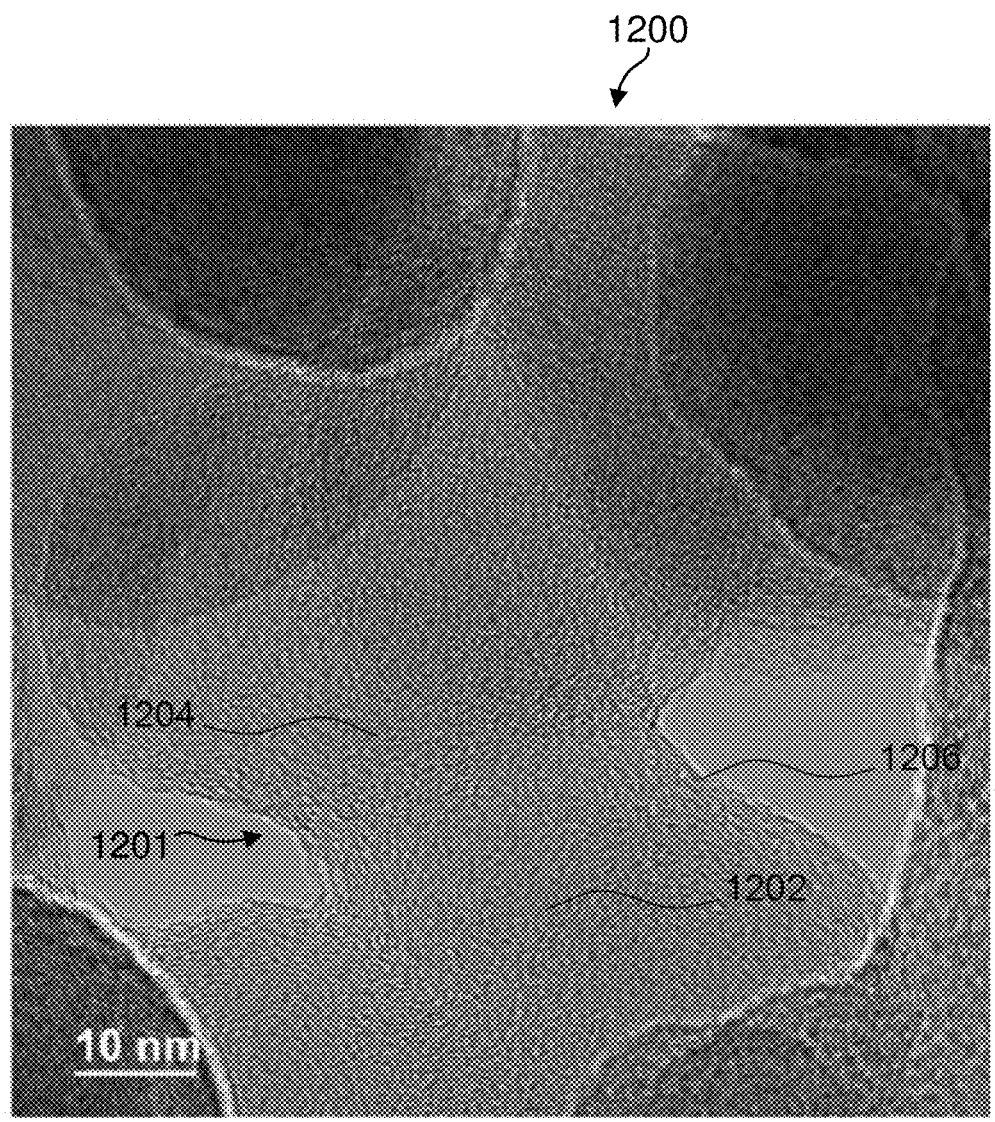

FIG. 10 depicts a micrograph image 1200 of a necked carbon nano-onion 1201 formed by the thermal cracking apparatus and methods described herein, according to some embodiments. FIG. 10 was taken by TEM techniques. The necked carbon nano-onion 1201 comprises a first carbon region 1202 and a second carbon region 1204, where the first carbon region 1202 and the second carbon region 1204 are joined by a necked region 1206 with single-walled nanotubes and/or multi-walled nanotubes, forming a conjoined or necked carbon nano-onion having a barbell shape.

Figure 11:
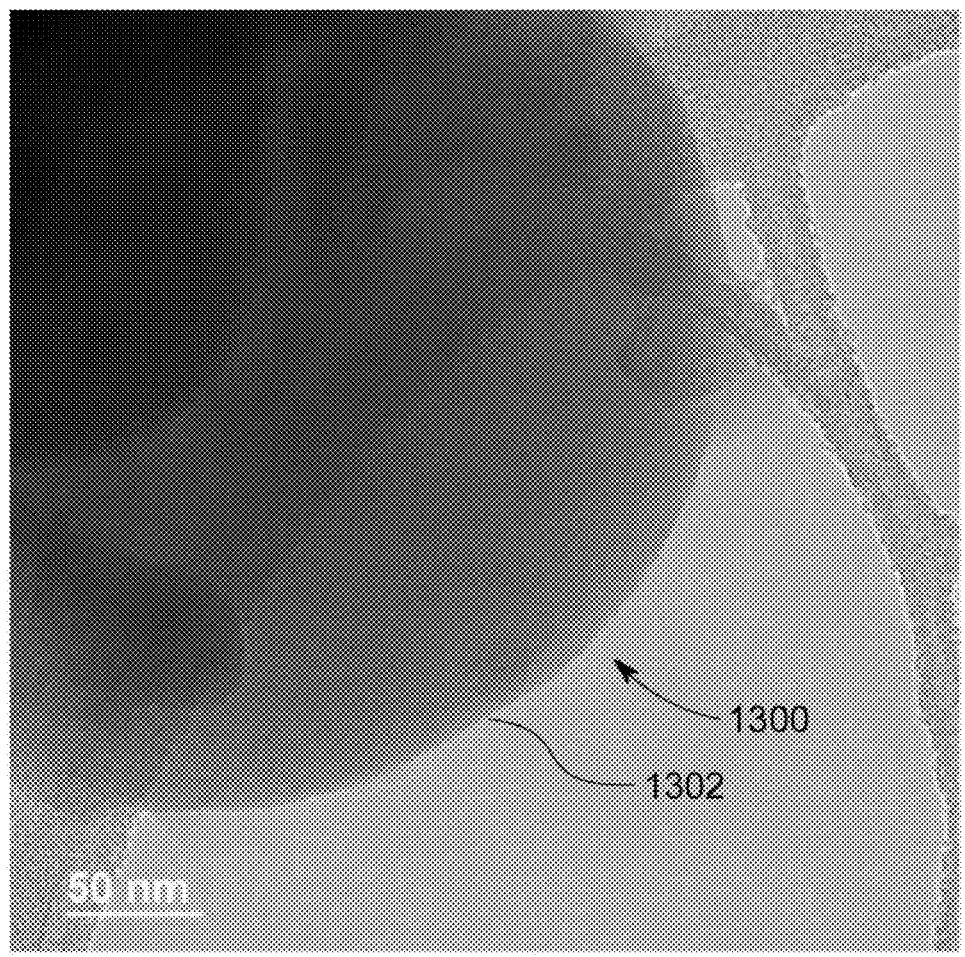

FIG. 11 depicts a micrograph image 1300 of a large carbon nano-onion 1302 formed by the thermal cracking apparatus and methods described herein, according to some embodiments. FIG. 11 was taken by TEM techniques. The large carbon nano-onion 1302 has a spherical shape and a diameter of approximately 300 nm. Although the graphene molecules cannot be seen because the image 1300 is taken from a further distance, the large carbon nano-onion 1302 nonetheless comprises a plurality of graphene molecules, as is discussed above with respect to the small carbon nano-onions 1002, 1004 and the medium-sized carbon nano-onion 1102.

Figure 12:
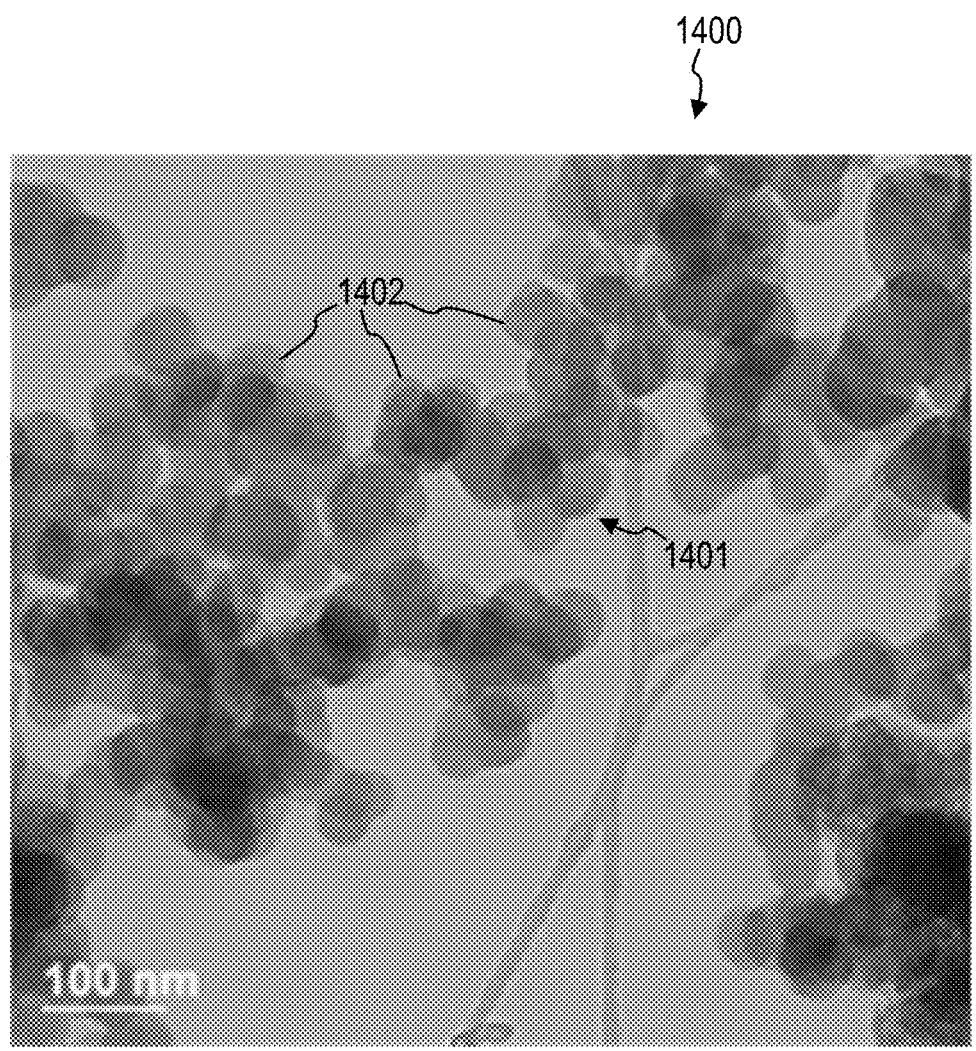

FIG. 12 depicts a micrograph image 1400 of at least one necked carbon nano-onion 1401 formed by the thermal cracking apparatus and methods described herein, according to some embodiments. FIG. 12 was taken by TEM techniques. The necked carbon nano-onion 1401 comprises a number of carbon nano-onions 1402 joined together as if in a string or necklace. The carbon nano-onions 1402 are generally connected together by necked regions (generally too small to distinguish at the scale of the micrograph image 1400), such as single-walled nanotubes and/or multi-walled nanotubes.

Figure 13:
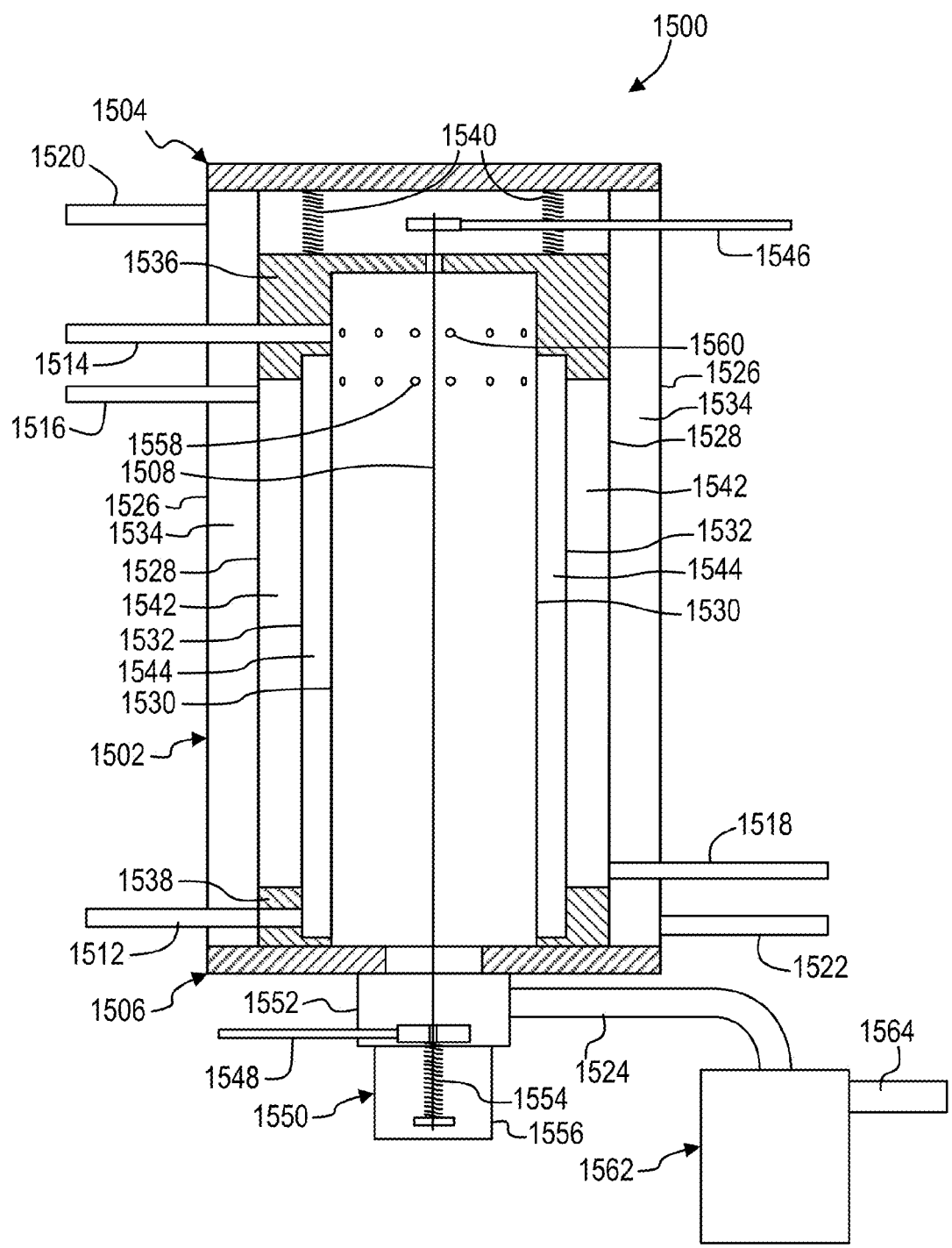
FIG. 13 depicts a simplified schematic view of a cracking apparatus in accordance with at least some embodiments.

FIG. 13 depicts a simplified schematic view of a thermal cracking apparatus 1500, in accordance with at least some embodiments. The thermal cracking apparatus 1500 generally includes a body 1502, a top cap assembly 1504, a bottom cap assembly 1506, a heating element 1508, a feedstock process gas preheat inlet 1512, a secondary feedstock process gas inlet 1514, one or more cooling gas inlets and outlets 1516 and 1518, a cooling fluid inlet and outlet 1520 and 1522, and a product outlet 1524, among other components shown (but not labeled) or not shown for simplicity and ease of illustration and description.

The body 1502 generally includes an outer shell or housing 1526, a secondary shell 1528, an inner reactor tube (an insert or heating chamber) 1530, and an outer reactor tube 1532. The body 1502 is considered a dual wall structure or dual tube reactor because it generally includes both of the reactor tubes 1530 and 1532 disposed within the shells 1526 and 1528. (In some embodiments, the outer reactor tube 1532 is considered to be another shell surrounding the inner reactor tube 1530.) The shells 1526 and 1528 and the reactor tubes 1530 and 1532 are generally cylindrical in shape with a central longitudinal axis arranged vertically. The inner reactor tube 1530 is generally made of quartz, alumina, or other appropriate material for withstanding the operational temperatures of the reaction zone. The shells 1526 and 1528 and the outer reactor tube 1532 are generally made of steel, titanium, or other appropriate materials.

The top cap assembly 1504 and the bottom cap assembly 1506 are generally made of steel or other appropriate materials. The top cap assembly 1504 and the bottom cap assembly 1506 are mounted or attached to the top and bottom, respectively, of the shells 1526 and 1528 to hold the shells 1526 and 1528 in a generally concentric arrangement or relationship to each other with a space 1534 there between. The space 1534 between the shells 1526 and 1528 defines a cooling fluid region.

A top and bottom plug, cap or insert 1536 and 1538 are disposed within the secondary shell 1528 near the top and bottom, respectively, of the body 1502. The top and bottom plugs 1536 and 1538 are generally made of steel or other appropriate materials. The bottom plug 1538 is mounted or set within the secondary shell 1528 down against an inner surface or flange of the bottom cap assembly 1506 and engages bottom ends of the reactor tubes 1530 and 1532. The top plug 1536 is mounted or set within the secondary shell 1528 near a top end of the secondary shell 1528 and engages top ends of the reactor tubes 1530 and 1532. A compression spring assembly 1540 engages the top plug 1536 and an inner surface or flange of the top cap assembly 1504 to press the top plug 1536 to the reactor tubes 1530 and 1532, the reactor tubes 1530 and 1532 to the bottom plug 1538, and the bottom plug 1538 to the inner surface or flange of the bottom cap assembly 1506, thereby holding the reactor tubes 1530 and 1532 in place. The top and bottom plugs 1536 and 1538 generally hold the reactor tubes 1530 and 1532 in a generally concentric arrangement or relationship to each other and to the secondary shell 1528, with a space 1542 between the outer reactor tube 1532 and the secondary shell 1528, and a space 1544 between the inner reactor tube 1530 and the outer reactor tube 1532. The space 1542 between the outer reactor tube 1532 and the secondary shell 1528 defines a gas coolant region. The space 1544 between the inner reactor tube 1530 and the outer reactor tube 1532 defines a feedstock gas preheating region.

The heating element 1508 is any appropriate type described above and extends along, generally concentrically with, and parallel to, the central longitudinal axis of the body 1502 or the inner reactor tube 1530. The heating element 1508 is mounted or attached at a top end to a top electrode assembly 1546 that is mounted or attached to the body 1502 and extends through the shells 1526 and 1528 above the top plug 1536. In the illustrated embodiment, the heating element 1508 is mounted or attached at a bottom end to a bottom electrode assembly 1548 and a spring bias assembly 1550. The bottom electrode assembly 1548 is mounted or attached to a lower portion 1552 of the bottom cap assembly 1506 and extends through the lower portion 1552 to contact the heating element 1508 through a hole in the bottom electrode assembly 1548. The spring bias assembly 1550 includes a spring 1554 within a cylindrical housing 1556 that is attached or mounted to the underside of the lower portion 1552 of the bottom cap assembly 1506. The heating element 1508 extends through a hole in the bottom cap assembly 1506 and the hole in the bottom electrode assembly 1548 down to the bottom of the spring 1554. The heating element 1508 is attached to the bottom of the spring 1554 and is held in tension by the spring 1554 acting against the underside of the bottom electrode assembly 1548. Thus, when the heating element 1508 heats up during gas processing or thermal cracking operations and cools down afterwards, any thermal expansion or contraction of the heating element 1508 is compensated for by the spring bias assembly 1550, which maintains the heating element 1508 in tension, so that the heating element 1508 remains generally concentric and parallel to the central longitudinal axis of the body 1502 or the inner reactor tube 1530.

An interior surface of a wall of the inner reactor tube 1530 defines an inner volume, all or part of which includes a longitudinal elongated reaction zone generated in the vicinity of the heating element 1508 during gas processing or thermal cracking operations. The inner reactor tube 1530 is thus the heating or reaction chamber of the thermal cracking apparatus 1500, and the central longitudinal axis of the body 1502 or the inner reactor tube 1530 is also considered to be a central longitudinal axis of the longitudinal elongated reaction zone.

Electrical power is provided to the heating element 1508 through the top electrode assembly 1546 and the bottom electrode assembly 1548 during gas processing operations. The top electrode assembly 1546 electrically connects to, or near, the top of the heating element 1508. The bottom electrode assembly 1548 electrically connects to, or near, the bottom of the heating element 1508, either directly to the heating element 1508 (within the hole therein) or through an electrical connection to the spring 1554.

The feedstock process gas preheat inlet 1512 is fluidly connected to a feedstock process gas source (not shown). The feedstock process gas preheat inlet 1512 is also attached or mounted to the shells 1526 and 1528 to be in fluid communication with the feedstock gas preheating region (space 1544) via apertures or holes through the shells 1526 and 1528, the bottom plug 1538, and the outer reactor tube 1532. During gas processing operations, the feedstock process gas is flowed from the source through the feedstock process gas preheat inlet 1512 and into the feedstock process gas preheating region (space 1544). The feedstock process gas then circulates across the outer surface of the inner reactor tube 1530. The inner reactor tube 1530 is typically very hot due to the thermal gas processing occurring therein. The circulation of the feedstock process gas around the inner reactor tube 1530, thus, serves the dual purpose of cooling the inner reactor tube 1530 and preheating the feedstock process gas with residual heat transferred through the wall of the inner reactor tube 1530 from the reaction zone. For embodiments in which the gas flow direction is downward, a series of holes or apertures 1558 in the wall of the inner reactor tube 1530 near the top of the feedstock gas preheating region (space 1544) allow the preheated feedstock process gas to flow into the inner volume of the inner reactor tube 1530, i.e., the reaction zone. Within the inner volume or the reaction zone, the preheated feedstock process gas circulates around the heating element 1508, which further heats the feedstock process gas in the vicinity thereof to thermally crack the feedstock process gas into constituent elements and/or lower order molecules, i.e., the gaseous and solid products. For embodiments in which the gas flow direction is upward, on the other hand, the series of holes or apertures 1558 in the wall of the inner reactor tube 1530 are placed near the bottom of the feedstock gas preheating region (space 1544) and the feedstock process gas preheat inlet 1512 is placed near the top of the feedstock gas preheating region.

In some embodiments, the secondary feedstock process gas inlet 1514 is fluidly connected to a source (not shown) of a gas (e.g., a second feedstock process gas) having additional particles (e.g., nano-particles of Silicon (Si), Silicon Carbide (SiC), or other appropriate materials able to withstand the high temperatures of the process without melting) floating or suspended therein. The secondary feedstock process gas inlet 1514 is attached or mounted to the shells 1526 and 1528 to be in fluid communication with the inner volume of the inner reactor tube 1530 via apertures through the shells 1526 and 1528, the top plug 1536, and the inner reactor tube 1530. During gas processing operations, the feedstock process gas with additional particles is flowed from the source through the secondary feedstock process gas inlet 1514, through a series of holes or apertures 1560 (in the wall of the inner reactor tube 1530 near the top thereof), and into the inner volume of the inner reactor tube 1530, i.e., the reaction zone. Within the inner volume or the reaction zone, the feedstock process gas with additional particles mixes with the preheated feedstock process gas. In some embodiments, the additional particles have a melting point at or above about 500-1000° C. The temperature to which the additional particles are heated generally depends on various process parameters, such as the temperature of the heating element 1508, the flow rate of the feedstock process gas, the longitudinal length of the reaction zone, and the time that the additional particles spend within the reaction zone. Therefore, since the process parameters are set so that the additional particles are heated to a temperature lower than their melting point when they pass through the reaction zone, the solid carbon product (e.g., the graphene) produced from the feedstock process gas (e.g., the methane, natural gas, or other hydrocarbons) generally forms a coating around the additional particles. The coating generally includes one or more layers of the solid carbon product, such as one or more concentric layers of graphene, surrounding each additional particle. In this manner, carbon-coated nano-particles are formed within the reaction zone. Additionally, in some embodiments, the additional particles act as a catalyst in the thermal cracking of the feedstock process gas in the reaction zone.

In some embodiments, the feedstock process gas having additional particles, the secondary feedstock process gas inlet 1514, and the series of holes or apertures 1560 are considered optional or are not included in the thermal cracking apparatus 1500.

In some embodiments, the cooling gas inlet and outlet 1516 and 1518 are attached or mounted to the shells 1526 and 1528 to be in fluid communication with the gas coolant region, i.e., the space 1542 between the outer reactor tube 1532 and the secondary shell 1528, via apertures or holes through the shells 1526 and 1528. During gas processing operations, a coolant gas (e.g., air, nitrogen, a noble gas, etc.) is flowed from a source thereof, through the cooling gas inlet 1516, and into the gas coolant region (space 1542). The coolant gas thus circulates within the gas coolant region, absorbs some of the heat from the outer reactor tube 1532 (thereby serving to cool the outer reactor tube 1532), and exits through the outlet 1518 to be cooled, recycled, discarded or stored.

In some other embodiments, the space 1542 between the outer reactor tube 1532 and the secondary shell 1528 is filled with a thermally insulating or conducting material, rather than having a coolant gas flow therein. In various embodiments, the use or selection of the coolant gas or the thermally insulating or conducting material for the space 1542 generally depends on the thermal requirements for the overall configuration of the thermal cracking apparatus 1500, the type of the feedstock process gas, the type or characteristics of the desired solid and/or gaseous products, and/or the process parameters of the gas processing operations. Different embodiments, in other words, generally have different thermal requirements.

In some embodiments, the cooling fluid inlet and outlet 1520 and 1522 are attached or mounted to the outer shell 1526 to be in fluid communication with the cooling fluid region, i.e., the space 1534 between the shells 1526 and 1528, via apertures or holes through the outer shell 1526. During gas processing operations, a coolant fluid (e.g., water, etc.) is flowed from a source thereof, through the cooling fluid inlet 1520, and into the cooling fluid region (space 1534). The coolant fluid thus circulates within the cooling fluid region, absorbs some of the heat from the secondary shell 1528 (thereby cooling the secondary shell 1528), and exits through the outlet 1522 to be cooled, recycled, discarded or stored. In this manner, the action of the coolant fluid, or the combined action of the coolant fluid and the coolant gas, ensures that the outer surface of the thermal cracking apparatus 1500 (i.e., of the body 1502 or the outer shell 1526) remains cool, or does not become too hot to pose a danger to nearby equipment or personnel.

In the illustrated embodiment, the product outlet 1524 is mounted or attached to the lower portion 1552 of the bottom cap assembly 1506 for embodiments in which the gas flow direction is downward. (For embodiments in which the gas flow direction is upward, on the other hand, the product outlet 1524 is mounted or attached near the top of the inner volume of the inner reactor tube 1530.) The solid and gaseous products generally flow out the bottom cap assembly 1506, e.g., through a series of passageways through the bottom cap assembly 1506 leading to the product outlet 1524, and then to an appropriate storage apparatus, hopper, or other receiving mechanism 1562. In some embodiments, the gaseous and solid products enter the hopper 1562 and are exhausted with a Venturi assist and a flow of nitrogen gas. The solid products are removed by detaching the hopper 1562 from the product outlet 1524 and pouring them out. The gaseous products are removed by flowing through a gaseous product outlet 1564 from the hopper 1562. The gaseous product outlet 1564 is mounted or attached to the hopper 1562 to provide a fluid connection to the interior of the hopper 1562. The gaseous product outlet 1564 is also fluidly connected to a downstream storage apparatus or further gas processing apparatus. The gaseous products are thus flowed out through the gaseous product outlet 1564 to the downstream storage apparatus or further gas processing apparatus. Some embodiments incorporating an alternative exhaust system technique that may be used with the thermal cracking apparatus 1500, with appropriate adjustments or modifications thereto, are described below with respect to FIG. 14. Additionally, in some embodiments, different hoppers (e.g., having the same or different design or configuration) are used for different applications. For example, one hopper is used when producing the solid carbon products, and a different hopper is used when producing the carbon-coated nano-particles. Thus, the bottom cap assembly 1506 and the connection to the product outlet 1524 and/or the hopper 1562 are designed for removal and replacement of the hopper 1562, so that a clean or different hopper 1562 can be attached for each application.

In some situations, some of the solid products can accumulate within the inner volume of the inner reactor tube 1530, e.g., on the interior surface of the wall of the inner reactor tube 1530 and/or the heating element 1508. Some embodiments may also use any appropriate structures or subassemblies for forcibly removing the solid products or cleaning the reaction zone.

Figure 14:
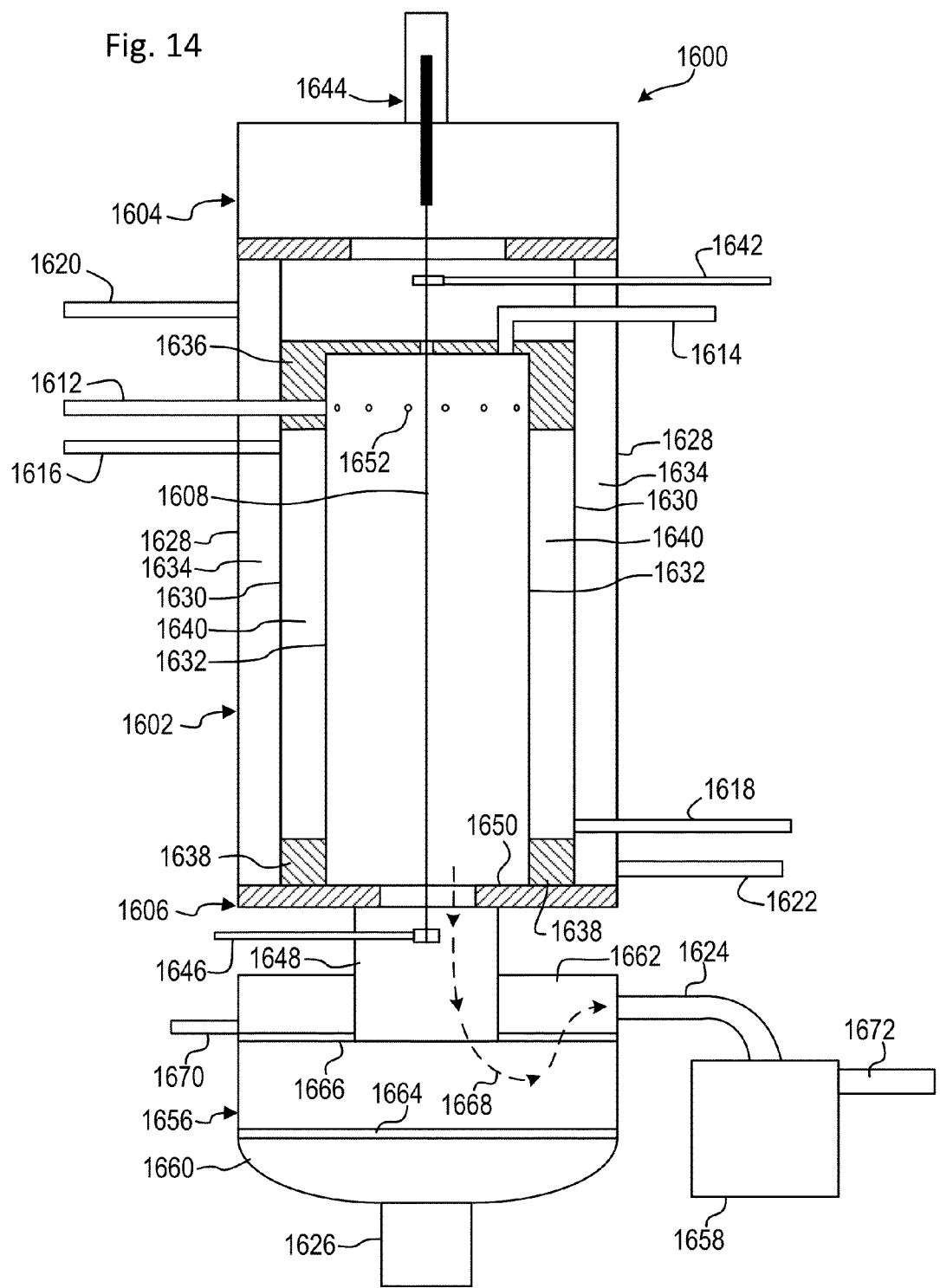
FIG. 14 depicts a simplified schematic view of a cracking apparatus in accordance with at least some embodiments.

FIG. 14 depicts a simplified schematic view of a thermal cracking apparatus 1600, in accordance with at least some embodiments. Some of the features described for the thermal cracking apparatus 1600 can be applied to the embodiment shown for the thermal cracking apparatus 1500 in FIG. 13, and some of the features described above for the thermal cracking apparatus 1500 can be applied to the embodiment for the thermal cracking apparatus 1600, as will be described below.

The thermal cracking apparatus 1600 generally includes a body 1602, a top cap assembly 1604, a bottom cap assembly 1606, a heating element 1608, a feedstock process gas inlet 1612, a secondary feedstock process gas inlet 1614, one or more cooling gas inlets and outlets 1616 and 1618, a cooling fluid inlet and outlet 1620 and 1622, a gaseous product outlet 1624, and a solid product outlet 1626, among other components shown (but not labeled) or not shown for simplicity and ease of illustration and description.

The body 1602 generally includes an outer shell or housing 1628, a secondary shell 1630, and a reactor tube (heating chamber) 1632. The body 1602 is considered a single wall structure or single tube reactor because it generally includes only the single reactor tube 1632 disposed within the shells 1628 and 1630. The single wall structure or single tube reactor embodiment of FIG. 14 is, thus, an alternative to the dual wall structure or dual tube reactor embodiment of FIG. 13. The shells 1628 and 1630 and the reactor tube 1632 are generally cylindrical in shape with a central longitudinal axis arranged vertically. The reactor tube 1632 is generally made of quartz, alumina, or other appropriate material for withstanding the operational temperatures of the reaction zone. The shells 1628 and 1630 are generally made of steel, titanium, or other appropriate materials.

The top cap assembly 1604 and the bottom cap assembly 1606 are generally made of steel or other appropriate materials. The top cap assembly 1604 and the bottom cap assembly 1606 are mounted or attached to the top and bottom, respectively, of the shells 1628 and 1630 to hold the shells 1628 and 1630 in a generally concentric arrangement or relationship to each other with a space 1634 there between. The space 1634 between the shells 1628 and 1630 defines a cooling fluid region.

A top and bottom plug, cap or insert 1636 and 1638 are disposed within the secondary shell 1630 near the top and bottom, respectively, of the body 1602. The top and bottom plugs 1636 and 1638 are generally made of steel or other appropriate materials. The bottom plug 1638 is mounted or set within the secondary shell 1630 down against an inner surface or flange of the bottom cap assembly 1606 and engages a bottom end of the reactor tube 1632. The top plug 1636 is mounted or set within the secondary shell 1630 near a top end of the secondary shell 1630 and engages a top end of the reactor tube 1632. The reactor tube 1632 and the top and bottom plugs 1636 and 1638 are generally held in place by any appropriate means, e.g., such as that described above for FIG. 13. The top and bottom plugs 1636 and 1638 generally hold the reactor tube 1632 in a generally concentric arrangement or relationship to the secondary shell 1630, with a space 1640 between the reactor tube 1632 and the secondary shell 1630. The space 1640 between the reactor tube 1632 and the secondary shell 1630 defines a gas coolant region.

The heating element 1608 is any appropriate type described above and extends along, generally concentrically with, and parallel to, the central longitudinal axis of the body 1602 or the reactor tube 1632. The heating element 1608 (at or near the top end thereof) contacts a top electrode assembly 1642 that is mounted or attached to the body 1602 and extends through the shells 1628 and 1630 above the top plug 1636. Additionally, the heating element 1608 is mounted or attached at a top end to a tensioning assembly 1644 (e.g., a pneumatic tensioning device, a spring biasing assembly, etc.) through a hole in the top electrode assembly 1642 and a hole in a lower portion of the top cap assembly 1604. The heating element 1608 is also mounted or attached at a bottom end to a bottom electrode assembly 1646. The bottom electrode assembly 1646 is mounted or attached to a lower portion 1648 of the bottom cap assembly 1606 and extends through the lower portion 1648 to connect to the heating element 1608 at a point along a longitudinal axis of the lower portion 1648, which is coaxial with the longitudinal axis of the body 1602 or the reactor tube 1632. The heating element 1608 extends through a hole in a flange 1650 of the bottom cap assembly 1606 down to the bottom electrode assembly 1646. The heating element 1608 is held in tension by the tensioning assembly 1644 acting against an upper portion of the top cap assembly 1604. Thus, when the heating element 1608 heats up during gas processing or thermal cracking operations and cools down afterwards, any thermal expansion or contraction of the heating element 1608 is compensated for by the tensioning assembly 1644, which maintains the heating element 1608 in tension, so that the heating element 1608 remains generally concentric and parallel to the central longitudinal axis of the body 1602 or the reactor tube 1632.

The technique described for FIG. 14 for mounting or attaching the heating element 1608 using the top and bottom electrodes 1642 and 1646 and the tensioning assembly 1644 is an alternative embodiment that can be applied to the overall embodiment shown in FIG. 13, given appropriate modifications to support this alternative structure. On the other hand, the technique described for FIG. 13 for mounting or attaching the heating element 1508 using the top and bottom electrodes 1546 and 1548 and the spring bias assembly 1550 is an alternative embodiment that can be applied to the overall embodiment shown in FIG. 14, given appropriate modifications to support this alternative structure.

An interior surface of a wall of the reactor tube 1632 defines an inner volume, all or part of which includes a longitudinal elongated reaction zone generated in the vicinity of the heating element 1608 during gas processing or thermal cracking operations. The reactor tube 1632 is thus the heating or reaction chamber of the thermal cracking apparatus 1600, and the central longitudinal axis of the body 1602 or the reactor tube 1632 is also considered to be a central longitudinal axis of the longitudinal elongated reaction zone.

Electrical power is provided to the heating element 1608 through the top electrode assembly 1642 and the bottom electrode assembly 1646 during gas processing operations. The top electrode assembly 1642 electrically connects to, or near, the top of the heating element 1608. The bottom electrode assembly 1646 electrically connects to, or near, the bottom of the heating element 1608.

The feedstock process gas inlet 1612 is fluidly connected to a feedstock process gas source (not shown). The feedstock process gas inlet 1612 is also attached or mounted to the shells 1628 and 1630 to be in fluid communication with the inner volume of the reactor tube 1632 via apertures or holes through the shells 1628 and 1630, the top plug 1636, and the reactor tube 1632. During gas processing operations, the feedstock process gas is flowed from the source through the feedstock process gas inlet 1612 and into the inner volume (the reaction zone) of the reactor tube 1632 through a series of holes or apertures 1652 in the wall of the reactor tube 1632 near the top of the reactor tube 1632, for embodiments in which the gas flow direction is downward. Within the inner volume or the reaction zone, the feedstock process gas circulates around the heating element 1608, which heats the feedstock process gas in the vicinity thereof to thermally crack the feedstock process gas into constituent elements and/or lower order molecules, i.e., the gaseous and solid products. For embodiments in which the gas flow direction is upward, on the other hand, the feedstock process gas inlet 1612 and the series of holes or apertures 1652 in the wall of the reactor tube 1632 are placed near the bottom of the reactor tube 1632.

In some embodiments, the secondary feedstock process gas inlet 1614 is fluidly connected to a source (not shown) of a second feedstock process gas having additional particles (e.g., nano-particles) floating therein. The secondary feedstock process gas inlet 1614 is attached or mounted through the shells 1628 and 1630 and the top plug 1636 to be in fluid communication with the inner volume of the reactor tube 1632 via apertures or holes through the shells 1628 and 1630 and the top plug 1636. During gas processing operations, the feedstock process gas with additional particles is flowed from the source through the secondary feedstock process gas inlet 1614 into the inner volume of the reactor tube 1632, i.e., the reaction zone. Within the inner volume or the reaction zone, the feedstock process gas with additional particles mixes with the feedstock process gas from the feedstock process gas inlet 1612. The additional particles (e.g., nano-particles of Silicon, silicon carbide, etc.) assist in the heating, and thus the thermal cracking, of the feedstock process gas in the reaction zone. In some embodiments, the feedstock process gas having additional particles and the secondary feedstock process gas inlet 1614 are considered optional or are not included in the thermal cracking apparatus 1500.

The technique described for FIG. 14 for providing the feedstock process gas with additional particles through the secondary feedstock process gas inlet 1614 is an alternative embodiment that can be applied to the overall embodiment shown in FIG. 13, given appropriate modifications to support this alternative structure. On the other hand, the technique described for FIG. 13 for providing the feedstock process gas with additional particles through the secondary feedstock process gas inlet 1514 is an alternative embodiment that can be applied to the overall embodiment shown in FIG. 14, given appropriate modifications to support this alternative structure.

In some embodiments, the cooling gas inlet and outlet 1616 and 1618 are attached or mounted to the shells 1628 and 1630 to be in fluid communication with the gas coolant region, i.e., the space 1640 between the reactor tube 1632 and the secondary shell 1630, via apertures or holes through the shells 1628 and 1630. During gas processing operations, a coolant gas (e.g., air, nitrogen, a noble gas, etc.) is flowed from a source thereof, through the cooling gas inlet 1616, and into the gas coolant region (space 1640). The coolant gas thus circulates within the gas coolant region, absorbs some of the heat from the reactor tube 1632 (thereby serving to cool the reactor tube 1632), and exits through the outlet 1618 to be cooled, recycled, discarded or stored.

In some other embodiments, the space 1640 between the reactor tube 1632 and the secondary shell 1630 is filled with a thermally insulating or conducting material, rather than having a coolant gas flow therein. In various embodiments, the use or selection of the coolant gas or the thermally insulating or conducting material for the space 1640 generally depends on the thermal requirements for the overall configuration of the thermal cracking apparatus 1600, the type of the feedstock process gas, the type or characteristics of the desired solid and/or gaseous products, and/or the process parameters of the gas processing operations. Different embodiments, in other words, generally have different thermal requirements.

In some embodiments, the cooling fluid inlet and outlet 1620 and 1622 are attached or mounted to the outer shell 1628 to be in fluid communication with the cooling fluid region, i.e., the space 1634 between the shells 1628 and 1630, via apertures or holes through the outer shell 1628. During gas processing operations, a coolant fluid (e.g., water, etc.) is flowed from a source thereof, through the cooling fluid inlet 1620, and into the cooling fluid region (space 1634). The coolant fluid thus circulates within the cooling fluid region, absorbs some of the heat from the secondary shell 1630 (thereby cooling the secondary shell 1630), and exits through the outlet 1622 to be cooled, recycled, discarded or stored. In this manner, the action of the coolant fluid, or the combined action of the coolant fluid and the coolant gas, ensures that the outer surface of the thermal cracking apparatus 1600 (i.e., of the body 1602 or the outer shell 1628) remains cool, or does not become too hot to pose a danger to nearby equipment or personnel.

In the illustrated embodiment, the thermal cracking apparatus 1600 further includes a primary hopper 1656 and a secondary hopper 1658. (As mentioned above for the hopper 1562, in some embodiments, different hoppers 1656 and/or 1658 are used for different applications, so the thermal cracking apparatus 1600 is designed with an attachment mechanism for removal and replacement of the hopper 1656 and/or 1658, so that a clean or different hopper 1656 and/or 1658 can be attached for each application.) The primary hopper 1656 is mounted or attached to the lower portion 1648 of the bottom cap assembly 1606. The primary hopper 1656 generally has lower and upper portions 1660 and 1662 and lower and upper filters 1664 and 1666. The lower portion 1648 of the bottom cap assembly 1606 extends through the upper portion 1662 and the upper filter 1666 down to the lower portion 1660 to provide a fluid connection between the inner volume of the reactor tube 1632 and the lower portion 1660. The upper filter 1666 generally separates the lower and upper portions 1660 and 1662. The lower filter 1664 is disposed at or near the bottom of the lower portion 1660 at the solid product outlet 1626. The solid product outlet 1626 is mounted or attached to the lower portion 1660, at or near a bottom thereof. The gaseous product outlet 1624 is mounted or attached to the upper portion 1662 (at or near a side thereof) to provide a fluid connection between the upper portion 1662 and the secondary hopper 1658.

During gas processing operations, the gaseous and solid products fall or flow down from the inner volume of the reactor tube 1632, through the hole in the flange 1650, through the lower portion 1648 of the bottom cap assembly 1606, and into the lower portion 1660 of the primary hopper 1656, for embodiments in which the gas flow direction is downward. The solid products generally continue to fall and pass out through the solid product outlet 1626. The desired solid product is typically the carbon nano-particles described above; however, some larger aggregate particles, debris or flake material can also sometimes form within the reactor tube 1632 and fall down into the primary hopper 1656. The lower filter 1664 is generally designed or selected to be capable of catching these larger particles and allowing the desired solid product to pass through to the solid product outlet 1626. The larger particles are periodically removed from the primary hopper 1656. For embodiments in which the gas flow direction is upward, on the other hand, the solid products flow out of the reactor tube 1632 near the top thereof, unless the solid products are heavy enough to fall against the gas flow, in which case the solid product outlet can be placed near the bottom of the reactor tube 1632, similar to that described previously.

For embodiments in which the gas flow direction is downward, the gaseous product is generally forced to flow (in the direction of arrows 1668) down from the reactor tube 1632, into the lower portion 1660 of the primary hopper 1656, up through the upper filter 1666, into the upper portion 1662, and out through the gaseous product outlet 1624. (For embodiments in which the gas flow direction is upward, on the other hand, the gaseous product is generally forced to flow out of the reactor tube 1632 near the top thereof.) Some of the solid product (such as the smaller particles) can potentially be swept up in the flow of the gaseous product, instead of falling to the bottom of the primary hopper 1656 as mentioned above. The upper filter 1666 is generally designed or selected to be capable of catching these particles, which eventually are removed with the other solid products through the solid product outlet 1626. An ultrasonic port 1670 (mounted or attached to the upper portion 1662) provides an ultrasonic or mechanical vibrational assist for removing these particles by the upper filter 1666. The gaseous product is exhausted with a Venturi assist and a flow of nitrogen gas through the gaseous product outlet 1624 to the secondary hopper 1658. Most of the solid product has been removed from the gaseous product at this point, but some can still remain. Thus, additional gas/solid separation via cyclone or electrical precipitation is implemented for further separation at the secondary hopper 1658. The gaseous products are then removed by flowing through a gaseous product outlet 1672 from the secondary hopper 1658. The gaseous product outlet 1672 is mounted or attached to the secondary hopper 1658 to provide a fluid connection to the interior of the hopper 1658. The gaseous product outlet 1672 is also fluidly connected to a downstream storage apparatus or further gas processing apparatus. The gaseous products are thus flowed out through the gaseous product outlet 1564 to the downstream storage apparatus or further gas processing apparatus.

The exhaust system technique described for FIG. 14 for exhausting and separating the gaseous and solid products through the hoppers 1656 and 1658 is an alternative embodiment that can be applied to the overall embodiment shown in FIG. 13, given appropriate modifications to support this alternative structure. On the other hand, the exhaust system technique described for FIG. 13 for exhausting and separating the gaseous and solid products through the hopper 1562 is an alternative embodiment that can be applied to the overall embodiment shown in FIG. 14, given appropriate modifications to support this alternative structure.

In some situations, some of the solid products can accumulate within the inner volume of the reactor tube 1632, e.g., on the interior surface of the wall of the reactor tube 1632 and/or the heating element 1608. Some embodiments may also use any appropriate structures or subassemblies for forcibly removing the solid products or cleaning the reaction zone.

FIG. 15 depicts a simplified process flow diagram of a method 1800 for cracking a feedstock process gas in accordance with at least some embodiments, which may be an alternative embodiment to, or a more detailed embodiment of, the method 100 shown in FIG. 1, so that the steps of the method 1800 are performed in addition to or in place of some or all of the steps of method 100. The particular steps, combination of steps, and order of steps are shown for illustrative and explanatory purposes only. Other embodiments may include other steps, combinations of steps, and/or orders of steps to achieve generally similar results.

The method 1800, and variations thereof, may be carried out in any suitable thermal cracking apparatus as disclosed herein capable of control in accordance with the teachings provided herein. Illustrative, but non-limiting, examples of embodiments of a suitable apparatus are described above with respect to FIGS. 2-7, 13 and 14.

Upon starting the method 1800 (at 1802), the feedstock process gas source (or sources with and without the additional nano-particles) is turned on and the thermal cracking apparatus is allowed to heat up to an operating temperature (e.g., so that the temperature of the inner wall of the reactor tube, or heating chamber, reaches at least 200° C.). In some embodiments, the product separation and exhaust components or assembly (e.g., from the point at which the desired products exit the heating chamber to the downstream storage or further processing components) is also heated to, and maintained at, a temperature of about 300° C., or other appropriate temperature that prevents volatile organic material or compounds from being absorbed in the collected solid product. In some embodiments, the purge gas is flowed through the inner volume of the thermal cracking apparatus, i.e., of the heating chamber, as described above at this time.

For embodiments that incorporate the preheating features shown in FIG. 13 (or other suitable preheating structure), the feedstock process gas (without additional nano-particles) is fed (at 1804) into the thermal cracking apparatus (e.g., at the bottom, as shown in FIG. 13) for pre-heating before entering the reaction zone. The feedstock process gas thus circulates around the heating chamber (e.g., reaction tube or insert of the body of the thermal cracking apparatus) to cool the heating chamber and preheat the feedstock process gas.

The preheated feedstock process gas (or the non-preheated feedstock process gas, for embodiments that do not include the preheating features) then enters the reaction zone of the heating chamber and (at 1806) is cracked thermally within the reaction zone surrounding the heating element. In some embodiments, the thermal cracking is performed with the heating element at a molecular cracking temperature greater than 1600° C. and less than 2200° C. the gas flow at a rate greater than 1 slm (standard liter per minute), and a minimum temperature of the wall of the heating chamber (i.e., of the inner volume) of 200° C. Other embodiments may use other values for these operating parameters (e.g., as mentioned herein), depending on the thermal requirements for the overall configuration of the thermal cracking apparatus, the type of the feedstock process gas, the type or characteristics of the desired solid and/or gaseous products, and/or the process parameters of the gas processing operations, among other potential considerations.

A reaction zone cleaning cycle is implemented (at 1808), e.g., by activating an appropriate solid product removal mechanism. In some embodiments, the cleaning cycle is performed every few seconds or minutes, e.g., at a minimum of 100 seconds to a maximum of 600 seconds or other appropriate time interval (dependent on carbon deposition rate), to ensure that the inner surface of the heating chamber and the heating element are kept relatively clean. Experiments have shown that the overall operating efficiency of the thermal cracking apparatus is substantially higher when the cleaning cycle is performed regularly, thereby resulting in a substantially greater production rate for the gaseous and solid products, even at lower temperatures and higher flow rates, compared to an example process in which no cleaning cycle is performed. In some embodiments, the improvement in the operating efficiency or production rate is on the order of about 25-30%.

The gaseous products and the solid products flow out of, or are collected from, (at 1810) the thermal cracking apparatus either through separate gaseous and solid product outlets or the same combined product outlet. In some embodiments, the gaseous and solid products enter the hopper, are filtered with an ultrasonic or mechanical vibrational assist, and are exhausted with a Venturi assist and a flow of nitrogen gas. In some embodiments, additional gas/solid separation is performed (at 1812) via cyclone or electrical precipitation downstream of an initial separation hopper. In some embodiments, un-abated gas/solid material is sent (at 1814) to a wet and/or dry scrubber.

Although a few example embodiments have been described in detail above, those skilled in the art will appreciate that many modifications are possible in embodiments without materially departing from the teachings disclosed herein. Any and all such modifications are intended to be included within the embodiments of the invention, and other embodiments may be devised without departing from the scope thereof.

The invention claimed is:

1. A method comprising:
providing a thermal cracking apparatus having an inner volume that has a longitudinal axis and an elongated heating element disposed within the inner volume along the longitudinal axis;
heating the elongated heating element by electrical power to a molecular cracking temperature to generate a longitudinal elongated reaction zone within the inner volume;
flowing a feedstock process gas into the inner volume and longitudinally through the longitudinal elongated reaction zone, wherein the feedstock process gas is heated by heat from the elongated heating element;
thermally cracking molecules of the feedstock process gas within the longitudinal elongated reaction zone into constituent components thereof as the feedstock process gas flows through the longitudinal elongated reaction zone; and
collecting the constituent components;
wherein:
the feedstock process gas comprises a hydrocarbon gas; and
the constituent components comprise hydrogen and carbon nano-particles.

2. The method of claim 1, wherein:
the carbon nano-particles include necked carbon nano-onions.

3. The method of claim 1, wherein:
the carbon nano-particles include at least one of: carbon nano-onions, carbon nanospheres, graphene, graphite, highly ordered pyrolytic graphite, single walled nanotubes, and multi-walled nanotubes.

4. The method of claim 1, wherein:
the carbon nano-particles have a size range of 5-500 nm.

5. The method of claim 1, further comprising:
preheating the feedstock process gas by flowing the feedstock process gas through a gas preheating region between a heating chamber and a shell of the thermal cracking apparatus before flowing the feedstock process gas into the inner volume, wherein the heating chamber is disposed within the shell and the heating chamber contains the longitudinal elongated reaction zone.

6. The method of claim 5, wherein:
the preheating of the feedstock process gas also cools the heating chamber.

7. The method of claim 5, wherein:
the preheating of the feedstock process gas heats the feedstock process gas to 100-500° C.

8. The method of claim 1, wherein:
the inner volume has a cylindrical shape with a constant diameter along the longitudinal axis.

9. The method of claim 1, wherein:
the inner volume tapers inwardly in a direction of flow of the feedstock process gas.

10. The method of claim 1, wherein:
the molecular cracking temperature of the heating element is 1600-2200° C.;
a flow rate of the feedstock process gas is greater than 1 standard liter per minute; and
a residence time of the feedstock process gas within the longitudinal elongated reaction zone is 0.1-100 seconds.

11. The method of claim 1, wherein:
the molecular cracking temperature of the heating element is 600-3000° C.

12. The method of claim 1, wherein:
a pressure of the feedstock process gas within the inner volume is 0.5-10 atmospheres.

13. The method of claim 1, further comprising:
before flowing the feedstock process gas into the inner volume, flowing a purge gas through the inner volume with the heating element at a temperature of 600-3000° C. for 5-80 minutes at flow rate of 0.5-10 standard liter per minute.

14. The method of claim 1, wherein:
a temperature of a wall of the inner volume is at least 200° C.

15. A method comprising:
providing a thermal cracking apparatus having an inner volume that has a longitudinal axis and an elongated heating element disposed within the inner volume along the longitudinal axis;
heating the elongated heating element by electrical power to a molecular cracking temperature to generate a longitudinal elongated reaction zone within the inner volume;
flowing a feedstock process gas into the inner volume and longitudinally through the longitudinal elongated reaction zone, wherein the feedstock process gas is heated by heat from the elongated heating element;

thermally cracking molecules of the feedstock process gas within the longitudinal elongated reaction zone into constituent components thereof as the feedstock process gas flows through the longitudinal elongated reaction zone;

flowing a gas having nano-particles therein into the inner volume and through the longitudinal elongated reaction zone to mix with the feedstock process gas;

forming a coating of a solid product of the constituent components around the nano-particles; and collecting the constituent components.

16. The method of claim 15, further comprising:

heating the nano-particles to a temperature lower than a melting point of 500-1000° C. of the nano-particles.

17. The method of claim 15, wherein:

the nano-particles are at least one of: silicon and silicon carbide;

the solid product is graphene; and the coating of the solid product is one or more concentric layers of the graphene.

* * * * *